US007295860B2

(12) United States Patent
Suwa

(10) Patent No.: US 7,295,860 B2
(45) Date of Patent: Nov. 13, 2007

(54) RADIO COMMUNICATION APPARATUS

(75) Inventor: Yutaka Suwa, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 69 days.

(21) Appl. No.: 11/314,801

(22) Filed: Dec. 21, 2005

(65) Prior Publication Data

US 2006/0099989 A1 May 11, 2006

Related U.S. Application Data

(63) Continuation of application No. 10/214,882, filed on Aug. 8, 2002, now Pat. No. 7,010,323.

(30) Foreign Application Priority Data

Aug. 9, 2001 (JP) ............................ 2001-242894
Aug. 9, 2001 (JP) ............................ 2001-242946

(51) Int. Cl.
*H04B 7/00* (2006.01)
*H04M 1/00* (2006.01)

(52) U.S. Cl. ............................... 455/552.1; 455/67.11; 455/41.2

(58) Field of Classification Search ............ 455/552.1, 455/67.11, 67.14, 41.2, 411, 456.1, 422.1, 455/435.1, 432.2, 515, 550.1, 73, 450; 370/338
See application file for complete search history.

(56) References Cited

U.S. PATENT DOCUMENTS 5,987,020 A 11/1999 Abe
6,438,585 B2 8/2002 Mousseau et al.
6,477,156 B1 * 11/2002 Ala-Laurila et al. ........ 370/331
6,493,550 B1 12/2002 Raith
6,571,103 B1 5/2003 Novakov
6,748,195 B1 6/2004 Phillips (Continued)

FOREIGN PATENT DOCUMENTS

EP 1083622 3/2001

(Continued)

OTHER PUBLICATIONS

International Search Report for PCT/JP02/08115 dated Nov. 21, 2002.

*Primary Examiner*—Sonny Trinh
(74) *Attorney, Agent, or Firm*—RatnerPrestia

(57) ABSTRACT

A radio communication apparatus of the present invention comprises a radio unit capable of transmitting or receiving a first radio communication signal of a Bluetooth standard and a second radio communication signal of a cordless phone standard and a synchronism discriminator for discriminating a radio communication standard signal. The radio communication apparatus switches between first and second radio communication modes in response to a discrimination result of the synchronism discriminator, detects a type and a weight of a sound error every mode, and adds or subtracts the weight of the sound error in a present slot to or from a weight of a sound error in the previous slot in response to a degree of the sound error in the present slot. This structure allows a single apparatus to transmit or receive both of two kinds of radio communication standard signals, and the sound error is adequately and precisely handled in response to the type and weight of the sound error, thereby improving quality of the sound signal.

4 Claims, 29 Drawing Sheets

U.S. PATENT DOCUMENTS 6,823,186 B2 11/2004 Salokannel et al.
6,909,705 B1 * 6/2005 Lee et al. .................. 370/338
6,941,156 B2 * 9/2005 Mooney .................. 455/553.1
7,010,298 B2 * 3/2006 Seedman et al. ........... 455/434
7,024,189 B2 * 4/2006 Wonak et al. ........... 455/426.2
7,027,774 B2 * 4/2006 Kuon ........................ 455/41.2
7,171,233 B2 * 1/2007 Sanchez .................. 455/552.1
7,174,187 B1 * 2/2007 Ngan ...................... 455/552.1
2002/0039892 A1 4/2002 Lindell
2002/0102987 A1 8/2002 Souisse et al.
2003/0095518 A1 * 5/2003 Suwa ......................... 370/336

FOREIGN PATENT DOCUMENTS

JP 7-203543 8/1995
JP 09-215033 8/1997
JP 11-8879 1/1999
WO WO99/25125 5/1999
WO WO99/29126 6/1999

* cited by examiner

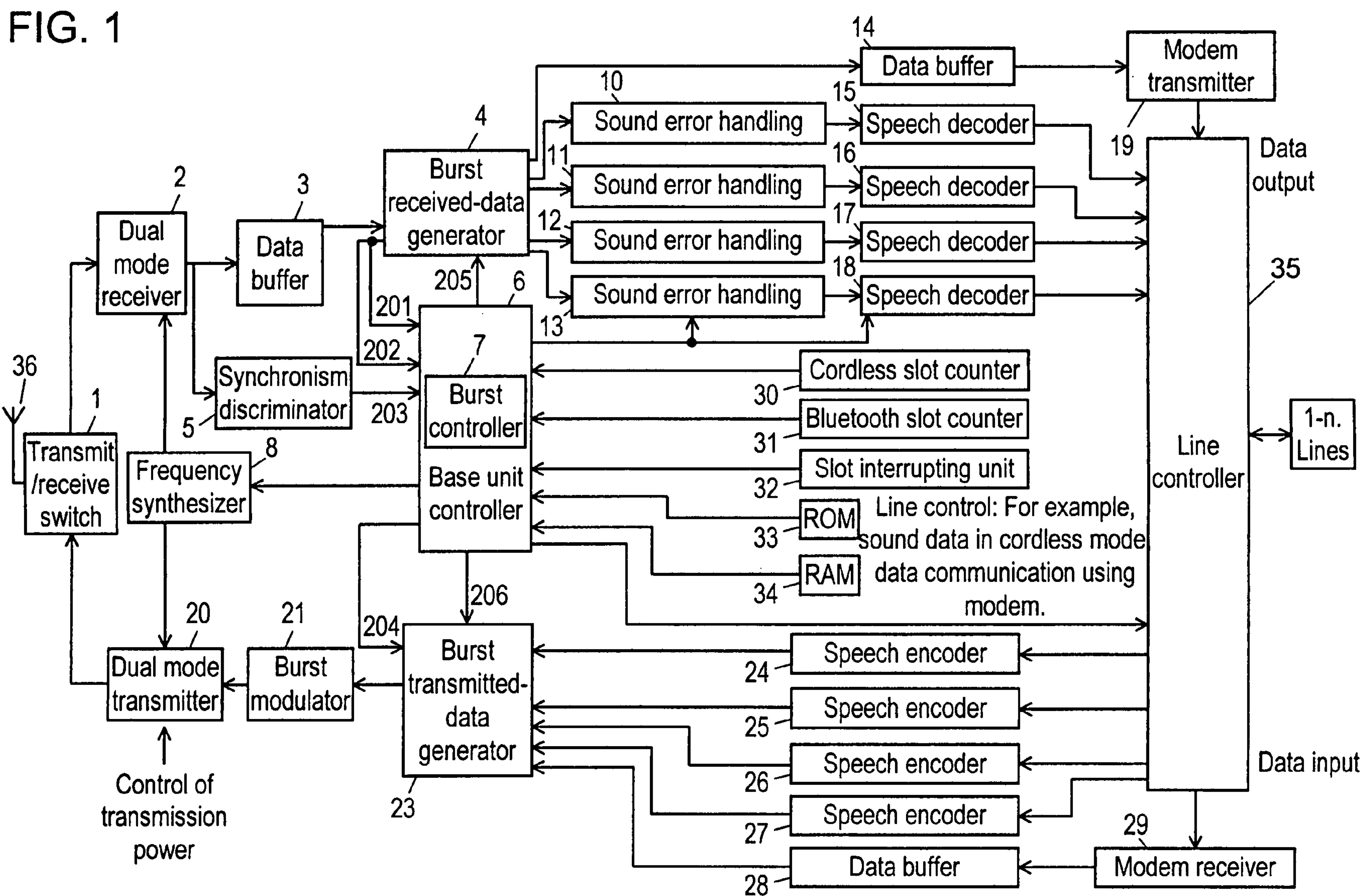
FIG. 1
Transmit /receive switch
Dual mode receiver
Data buffer
Synchronism discriminator
Frequency synthesizer
Burst received-data generator
Burst controller
Base unit controller
Burst transmitted-data generator
Burst modulator
Dual mode transmitter
Control of transmission power
Sound error handling
Sound error handling
Sound error handling
Sound error handling
Data buffer
Speech decoder
Speech decoder
Speech decoder
Speech decoder
Cordless slot counter
Bluetooth slot counter
Slot interrupting unit
ROM
RAM
Line control: For example, sound data in cordless mode data communication using modem.
Speech encoder
Speech encoder
Speech encoder
Speech encoder
Data buffer
Modem transmitter
Modem receiver
Line controller
Data output
Data input
1-n. Lines

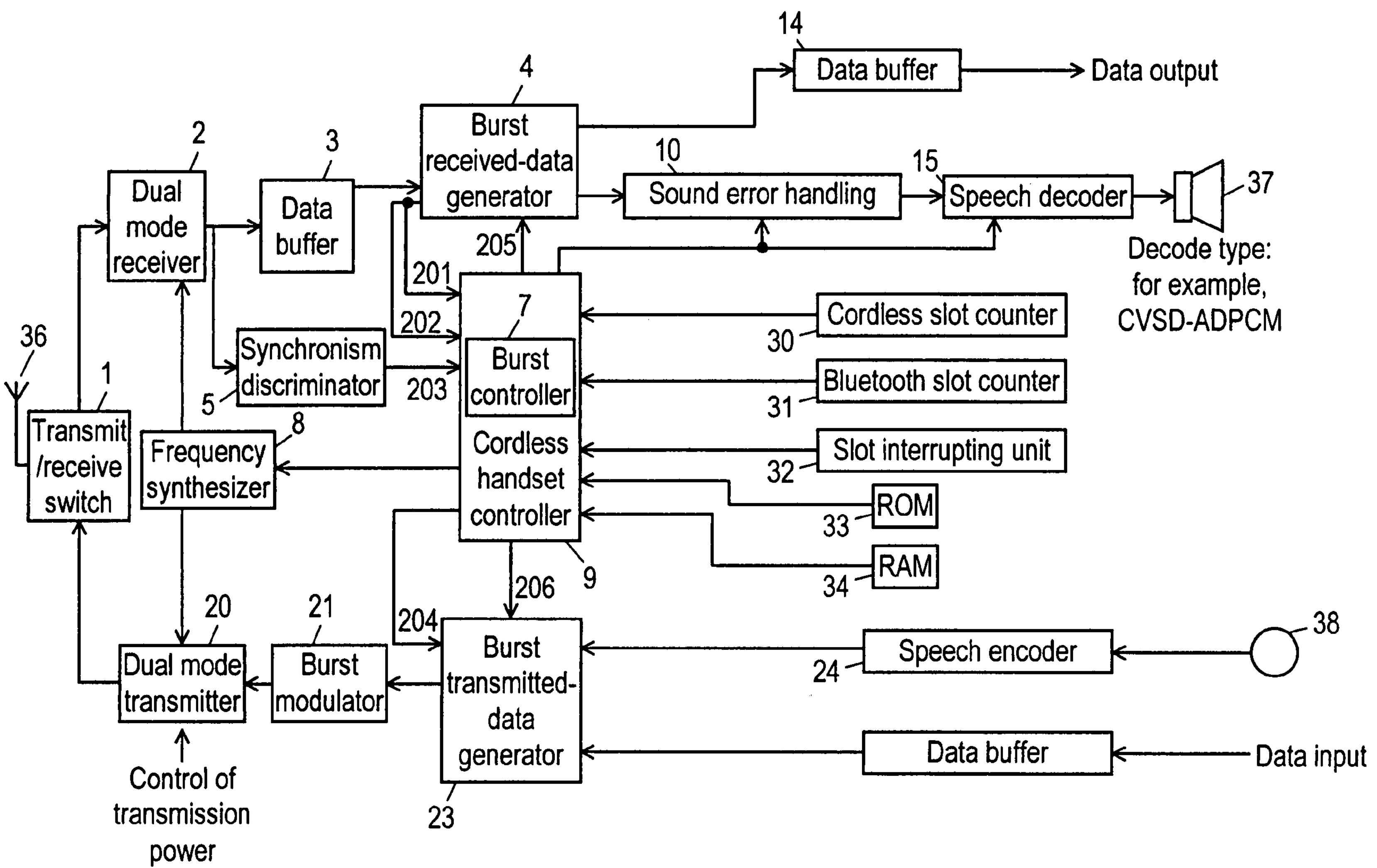
FIG. 2
14
Data buffer
Data output
4
Burst received-data generator
2
Dual mode receiver
3
Data buffer
10
Sound error handling
15
Speech decoder
37
Decode type:
for example,
CVSD-ADPCM
36
1
Transmit /receive switch
Synchronism discriminator
5
8
Frequency synthesizer
205
201
202
203
7
Burst controller
Cordless handset controller
9
Cordless slot counter
30
Bluetooth slot counter
31
Slot interrupting unit
32
ROM
33
RAM
34
206
204
20
Dual mode transmitter
21
Burst modulator
Burst transmitted-data generator
23
Control of transmission power
Speech encoder
24
38
Data buffer
Data input

RADIO COMMUNICATION APPARATUS

This application is a continuation of U.S. patent application Ser. No. 10/214,882, filed Aug. 8, 2002, now U.S. Pat. No. 7,010,323 the contents of which are incorporated herein by reference.

FIELD OF THE INVENTION

The present invention relates to a radio communication apparatus for transmitting, receiving, or processing radio signals in a plurality of modes including a time division multiple access (TDMA) mode.

BACKGROUND OF THE INVENTION

An apparatus having a wireless part instead of a wire part has recently become widespread. For example, a personal computer is connected to a printer by radio. For this radio connection, an apparatus employing a radio communication standard called Bluetooth has become widespread. Bluetooth is defined by a standardization group called the Bluetooth Special Interest Group (Bluetooth SIG). Bluetooth is normalized for the purpose of interconnecting a notebook-sized personal computer, a personal digital assistant (PDA), and a cellular phone without using a cable to communicate sound or data.

A cellular phone or a cordless phone connectable by Bluetooth is also developed as an option. Such a phone has both a Bluetooth system and a telephone system. A radio communication apparatus can thus be realized which includes a cellular phone or a cordless phone having a Bluetooth communication function and can perform the radio communication. A Bluetooth radio unit (BT radio unit) and a phone radio unit (CDL radio unit) are individually disposed for responding to radio signals with different modes in the prior art, and this structure leads to the enlargement of the apparatus and the cost increase.

DISCLOSURE OF THE INVENTION

A radio communication apparatus of the present invention has a synchronism discriminator for discriminating whether a radio communication standard signal received by a radio unit is a signal defined by a first radio communication standard or a second radio communication standard. This structure allows a single apparatus to transmit or receive both of two kinds of radio communication standard signals.

BRIEF DESCRIPTION OF THE DRAWINGS

FIG. 1 is a block diagram of a base unit of a radio communication apparatus in accordance with an exemplary embodiment 1 of the present invention.

FIG. 2 is a block diagram of a cordless handset of the radio communication apparatus in accordance with the exemplary embodiment 1.

DETAILED DESCRIPTION OF THE PREFERRED EMBODIMENT

Figure 3:
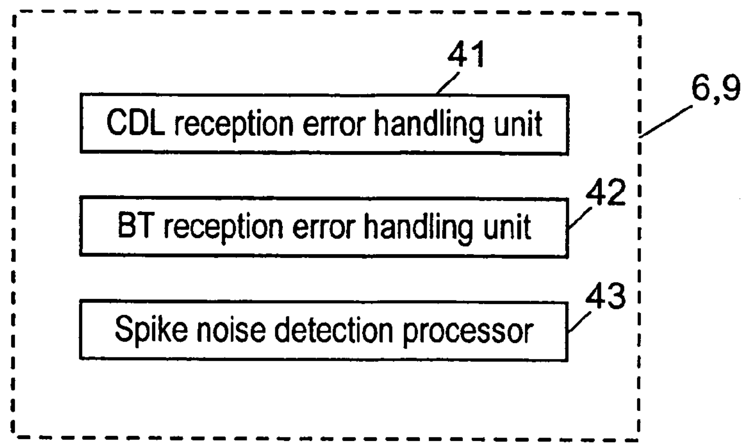
FIG. 3 is a function block diagram of process-by-process function realizing units in a base unit controller and a cordless handset controller of the radio communication apparatus in accordance with the exemplary embodiment 1.

Embodiments of the present invention will be described hereinafter with reference to the accompanying drawings. Same elements are denoted with the same reference numbers.

Exemplary Embodiment 1

FIG. 1 is a block diagram of a base unit of a radio communication apparatus in accordance with exemplary embodiment 1 of the present invention.

Transmit/receive switch 1 switches a signal route between a transmitting state and a receiving state. Dual mode receiver 2 receives signals in dual modes. Data buffers 3, 14, and 28 buffer data.

Synchronism discriminator 5 detects a "standard signal" in the received data, and discriminates whether the standard signal is a signal defined by a first radio communication standard or a second radio communication standard. The "standard signal" means a signal for defining an individual protocol or frame. In the present exemplary embodiment, signals are transmitted or received in a Bluetooth (BT) mode of the radio communication standard defined by Bluetooth SIG and the cordless phone (CDL) mode. Synchronism discriminator 5, on recognizing that the received data is BT data, outputs a BT informing signal indicating the recognition result. Synchronism discriminator 5, on recognizing that the received data is CDL data, outputs a CDL informing signal indicating the recognition result. Burst controller 7 included in base unit controller 6 for controlling an entire base unit recognizes whether the BT data or the CDL data is received, based on notification 203 from synchronism discriminator 5. Burst controller 7 informs burst received-data generator 4 of mode select signal 205 indicating which mode is selected. Burst received data generator 4 divides the received data in a format of the informed mode of dual modes. Sound error handling units 10 to 13 process sound based on an attenuator level and a filter level that are shown from burst controller 7 through burst received-data generator 4. Speech decoders 15 to 18 decode received sound signals. Modem transmitter 19 transmits the signals through a modem.

Dual mode transmitter 20 transmits the signals in dual modes while controlling power. Burst modulator 21 performs burst modulation. Burst transmitted-data generator 23 generates a packet to be transmitted in response to the format of the mode indicated from burst controller 7. Speech encoders 24 to 27 encode sound signals to be transmitted. Modem receiver 29 receives signals through a modem.

Cordless slot counter 30 counts clocks for discriminating a time position of a slot in the CDL mode. Cordless slot counter 30 outputs a count value when the notification from synchronism discriminator 5 indicates a CDL signal. Bluetooth slot counter 31 counts clocks for discriminating a time position of a slot in the BT mode. Bluetooth slot counter 31 outputs a count value when the notification from synchronism discriminator 5 indicates a BT signal. Slot interrupting unit 32 commands slot interruption. Read-only memory (ROM) 33 and random-access memory (RAM) 34 store data for the base unit controller. Line controller 35 controls a line for connection with the outside. Antenna 36 transmits or receives data from a cordless handset.

Transmit/receive switch 1, dual mode receiver 2, frequency synthesizer 8, and dual mode transmitter 20 constitute a radio unit. Elements other than the radio unit, ROM 33, RAM 34, and line controller 35 can be integrated as a base band integrated circuit (IC). A plurality of elements in the circuit block may be integrated into one element.

FIG. 2 is a block diagram of the cordless handset of the radio communication apparatus. A structure in FIG. 2 differs from the structure in FIG. 1 in that the structure in FIG. 2 comprises cordless handset controller 9 for controlling the entire cordless handset, one sound error handling unit 10 for processing sound, and one speech encoder 24 for encoding a sound signal. Additionally, instead of modem transmitter 19 and modem receiver 29, speaker 37 and microphone 38 are disposed as interfaces with a speaking person. A basic structure of the cordless handset is almost similar to that of the base unit.

Operations in the base unit are briefly described with reference to FIG. 1. Data coming through antenna 36 is sent to dual mode receiver 2 via transmit/receive switch 1 and received. The data received by dual mode receiver 2 in response to the present mode is fed into burst received-data generator 4 through data buffer 3. Synchronism discriminator 5 receives the received data from dual mode receiver 2, recognizes whether the received data is in the BT mode or the CDL mode of the dual modes, and informs burst controller 7 in base unit controller 6 of the recognition result. Burst received-data generator 4 divides the received data in the format of the mode shown from burst controller 7, and reads the contents of the received data.

Figure 10:
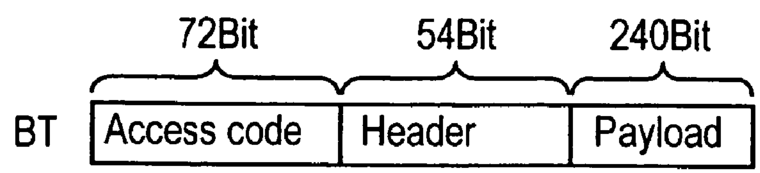
FIG. 10 is a format diagram of BT data of the radio communication apparatus in accordance with the exemplary embodiment 1.
Figure 11:
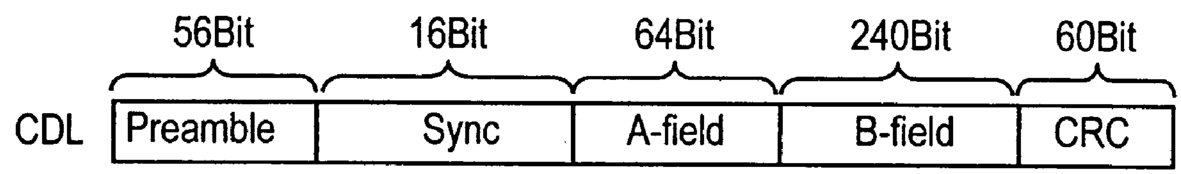
FIG. 11 is a format diagram of CDL data of the radio communication apparatus in accordance with the exemplary embodiment 1.

Data formats of the bluetooth (BT) and the cordless phone (CDL) are described hereinafter. FIG. 10 is a format diagram of BT data. FIG. 11 is a format diagram of CDL data. The BT data comprises an Access Code, a Header, and a Payload as shown in FIG. 10. The CDL data comprises a Preamble, a Syncword, an A-field, a B-field, and a Cyclic Redundancy Check (CRC) as shown in FIG. 11.

The Access Code of 72 bits in the BT data format used in synchronization sequentially comprises a Preamble (0101) of 4 bits, a Trailer (0101) of 4 bits, and a scrambled BT address of 64 bits. The BT address is constant independently of the apparatus. The Syncword of 16 bits in the CDL data format is peculiar to the radio communication apparatus comprising a base unit and a cordless handset. The Syncword of the base unit and the Syncword of the cordless handset have mutually inversed bits. The Syncword of the radio communication apparatus is preset so that it has no overlapping part on the bit string of the scrambled BT address.

The operations of synchronism discriminator 5 are described with reference to FIG. 10, FIG. 11,, and FIG. 1. Synchronism discriminator 5 simultaneously detects an Access Code in the BT mode, and a Syncword in the CDL mode from received packet data.

Synchronism discriminator 5 has a built-in correlator (not shown) for the BT Access Code and a built-in correlator (not shown) for the CDL Syncword for identifying the BT Access Code and the CDL Syncword. Synchronism discriminator 5 detects whether the data is BT data or CDL data based on the outputs from these correlators and informs burst controller 7 of a detection result. In other words, synchronism discriminator 5 detects that the data is the BT data when the correlator for the BT Access Code outputs the data, and detects that the data is the CDL data when the correlator for the CDL Syncword outputs the data.

When the received data includes data matching with the Access Code, synchronism discriminator 5 informs burst controller 7 via notification signal 203 that the received data is the BT data. When the received data includes data matching with the Syncword, synchronism discriminator 5 informs burst controller 7 via notification signal 203 that the received data is the CDL data.

Burst controller 7 recognizes whether the BT data or the CDL data is received based on the notification from synchronism discriminator 5, and informs burst received-data generator 4 via mode select signal 205 which mode is selected. A mode of burst received-data generator 4 is set based on mode select signal 205. Burst controller 7 stores following two data into RAM 34 in response to the notification from synchronism discriminator 5:

(A) a present count value (clock number) of a slot counter (cordless slot counter 30 or Bluetooth slot counter 31) at different times; and (B) mode information indicating the CDL mode or the BT mode.

When mode select signal 205 from synchronism discriminator 5 indicates that the received data is BT data, for example, a count value of Bluetooth slot counter 31 and the information indicating the BT mode are stored in RAM 34.

Next, based on the count value and the mode information stored, in RAM 34, a synchronization discriminating process is performed for discriminating whether or not the received slot is truly assigned to the terminal (base unit or cordless handset) in compliance with the CDL standard or the BT standard. The operation is described later in detail.

Now, operations of burst received-data generator 4 are described. Based on the mode select signal 205 from burst controller 7, a mode of burst received-data generator 4 is set depending on the received packet as discussed above. Burst received-data generator 4, when the received packet is in the cordless phone (CDL) mode, takes data in each of the Syncword field, A-field, and B-field out of the received data with an adequate timing. When the received packet is in the Bluetooth (BT) mode, the generator takes data in each of the Access Code, Header, and Payload fields out of the received data with an adequate timing. Burst received-data generator 4 sends radio control data 201 and radio quality data 202 to base unit controller 6. In the BT mode, radio control data 201 includes data read from the Header and Payload in FIG. 10. In the CDL mode, radio control data 201 includes data read from the A-field in FIG. 11. Radio control data 201 is used for connection and synchronization in the CDL mode. Message exchange during connecting and synchronizing is realized also in the BT mode, by receiving data 201 from burst received-data generator 4 and analyzing the contents of the data.

In the BT mode, radio quality data 202 includes information showing the presence or absence of errors in the Access Code and Header and showing an error ratio when the errors exist, and burst received-data generator 4 informs burst controller 7 of the information. In the CDL mode, radio quality data 202 includes information showing the presence or absence of errors in the Syncword, A-field, and B-field and showing an error ratio when the errors exist, and burst received-data generator 4 informs burst controller 7 of the information.

Radio quality data 202 indicates quality of a received pulse, and includes, for example, Eye data of the received pulse generated during receiving of the Preamble of the CDL data. The Eye data shows how a duty ratio of the pulse is close to 50%, and is used for exchanging antenna diversity or reception gain. This function cannot be used in the BT standard, since the Preamble typically has only four 4 bits. When a terminal (base unit or cordless handset) on the other end of the line is determined to be a product of which manufacturer is the same as that of the base unit based on the BT address exchanged in connection, however, both modes on the transmitting and receiving sides are switched to the manufacturer's own mode. In the own mode, the number of bits in the Preamble is increased. Thus, the quality of the received pulse is discriminated, and the antenna diversity or reception gain is exchanged similarly to the cordless phone.

Burst controller 7 also performs discrimination by weighting based on an error item shown by radio quality data 202 in sound error handlings at different times. Sound error handling units 10 to 13 attenuate or filter pulse code modulation (PCM) data fed every slot. This process compensates a sound signal lost by an error and reduces noise that can be generated by the error. In the CDL mode, the weighting in this process is executed as follows.

Case 1: When errors occur in the Syncword or A-field and have a level equal to or lower than a certain level and no error occurs in B-field, no process is performed.

Case 2: When errors occur in the Syncword or A-field and have a level equal to or lower than the certain level, and an error occurs also in B-field and has a level equal to or lower than the certain level, the attenuation and filtering are performed.

Case 3: When errors occur in the Syncword or A-field and have a level higher than the certain level, or an error occurs also in B-field and has a level higher than the certain level, the attenuation and filtering are performed more greatly than that in the Case 2, the received sound data (B-field data) is cancelled, and finally normally received sound data (B-field data) stored in a memory is used.

In the BT mode, the weighting is executed as follows.

Case 4: When errors occur in the Access Code or Header and have a level equal to or lower than a certain level and no error occurs in the Payload, no process is performed.

Case 5: When errors occur in the Access Code or Header and have a level equal to or lower than the certain level, and an error occurs also in the Payload and has a level equal to or lower than the certain level, the attenuation and filtering are performed.

Case 6: When errors occur in the Access Code or Header and have a level equal to or higher than the certain level, or an error occurs also in the Payload and has a level equal to or higher than the certain level, the attenuation and filtering are performed more sharply than that in the Case 5, the received sound data (Payload data) is cancelled, and finally normally received sound data (Payload data) stored in a memory is used.

Burst controller 7 calculates a reception timing based on count values of cordless slot counter 30 and Bluetooth slot counter 31. When the timing has been synchronized or during connection, burst controller 7 sets the BT mode or the CDL mode in burst received-data generator 4 even if there is no notification from synchronism discriminator 5.

Now, removal of spike noise is described. Sound error handling units 10 to 13 process sound data based on the notification from burst controller 7, and always check for spike noise by continuing to monitor a sound state. When the units detect occurrence of the spike noise on PCM data or adaptive differential pulse code modulation (ADPCM) data, the units perform the attenuation by the attenuator and the filtering.

The received data from burst received-data generator 4 is supplied to a line through data buffer 14, modem transmitter 19, and line controller 35. Speech decoders 15 to 18 decode the received data (sound data) processed by sound error handling units 10 to 13, and output the received data as sound data from line controller 35.

Now, operations of transmitting sound supplied through a line from the base unit to the cordless handset are described. The sound signals through the line is fed from line controller 35 of the base unit into speech encoders 24 to 27, encoded in the encoders, and supplied as sound data to burst transmitted-data generator 23. In other words, the sound data is fed into burst transmitted-data generator 23 through line controller 35, modem receiver 29, and data buffer 28.

RAM 34 stores information indicating the CDL mode or the BT mode that is discriminated based on the received data. Burst controller 7 discriminates the CDL transmitting slot or the BT transmitting slot by calculating a transmitting timing, based on the information data stored in RAM 34 and count values of cordless slot counter 30 and Bluetooth slot counter 31. Burst controller 7 informs burst transmitted-data generator 23 of the discrimination result via mode select signal 206.

Burst transmitted-data generator 23 receives radio control data 204, generates packet data including the sound data to be transmitted in response to the format of the informed mode, and then outputs the packet data to dual mode transmitter 20 through burst modulator 21. Base unit controller 6 controls transmission power of dual mode transmitter 20 in response to the mode. The packet data supplied from dual mode transmitter 20 is emitted as radio wave signals from antenna 36 to the air through transmit/receive switch 1. The radio wave signals are received by the cordless handset of FIG. 2, for example.

A maximum value of the transmission power of dual mode transmitter 20 is preferably 20 dBm in the BT mode, or 30 dBm in the CDL mode.

Now, operations of the cordless handset are briefly described with reference to FIG. 2. Data received by dual mode receiver 2 through transmit/receive switch 1 in response to a mode is fed into burst received-data generator 4 through data buffer 3. Burst received-data generator 4 divides the received data in the format of the mode informed from burst controller 7, and reads the contents of the received data. Synchronism discriminator 5 receives the received data from dual mode receiver 2, recognizes whether the received data is in the BT mode or the CDL mode, and informs burst controller 7 in cordless handset controller 9 of the recognition result. BT and CDL data formats are the same as those of the base unit.

Radio control data 201 and radio quality data 202 are the same as those of the base unit. Operations of burst received-data generator 4, burst controller 7, and sound error handling unit 10 are the same as those of the base unit.

Sound error handling unit 10 processes sound data based on notification from burst controller 7. Sound error handling unit 10 always checks for spike noise. On detecting spike noise, sound error handling unit 10 controls attenuance of an attenuator and a characteristic of a filter. The received data fed from burst received-data generator 4 is output through data buffer 14 to a universal serial bus (USB) of a personal computer or the like. Speech decoder 15 decodes the received data (sound data) processed by sound error handling unit 10, and outputs the received data as sound signals to speaker 37.

Now, transmission from the cordless handset is briefly described. Sound signals from microphone 38 are encoded in speech encoders 24, and supplied as sound data to burst transmitted-data generator 23. Data input from the personal computer or the like through the USB is supplied to burst transmitted-data generator 23 through data buffer 28. Burst controller 7 discriminates whether the input data must be transmitted through the CDL slot or the BT slot based on data stored in RAM 34 and count data, similarly to the transmitting operation of the base unit discussed above. Burst controller 7 supplies mode select signal 206 to burst transmitted-data generator 23 to inform the generator of the discriminated mode. Burst transmitted-data generator 23 receives radio control data 204, generates packet data to be transmitted in response to the format of the informed mode, and then outputs the packet data to dual mode transmitter 20 through burst modulator 21. Cordless handset controller 9 controls transmission power of dual mode transmitter 20 in response to the mode. The packet data supplied from dual mode transmitter 20 is emitted as radio wave signals from antenna 36 to the air through transmit/receive switch 1. The radio wave signals are received by the base unit of FIG. 1, for example.

Now, operations of base unit controller 6 and cordless handset controller 9 are described in detail with reference to FIG. 3 to FIG. 7.

In FIG. 3, each of base unit controller 6 and cordless handset controller 9 comprises the following process-by-process function realizing units:

Cordless phone (CDL) reception error handling unit 41;
Bluetooth (BT) reception error handling unit 42; and
spike noise detection processor 43.

Figure 4:
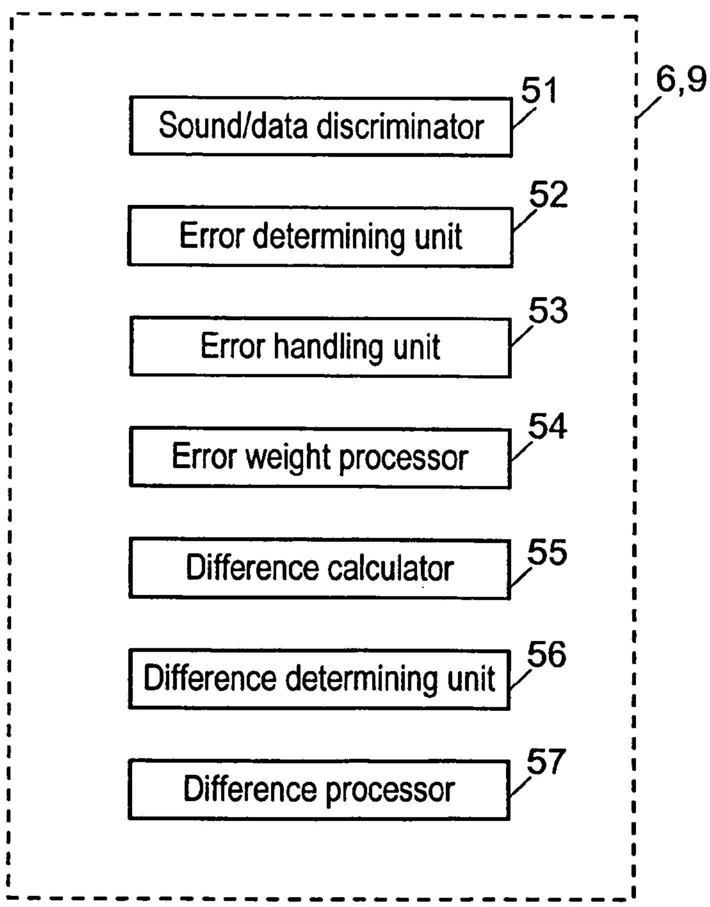
FIG. 4 is a function block diagram of step-by-step function realizing units in the base unit controller and the cordless handset controller of the radio communication apparatus in accordance with the exemplary embodiment 1.

In FIG. 4, each of base unit controller 6 and cordless handset controller 9 comprises the following step-by-step function realizing units:

sound/data discriminator 51;

error determining unit 52 for determining the presence or absence of an error;

error handling unit 53 for performing a process corresponding to the error;

error weight processor 54 for performing a process corresponding to error weight;

difference calculator 55 for calculating difference between the previous sound level and the present sound level;

difference determining unit 56 for determining whether or not the difference exceeds a predetermined value; and difference processor 57 for performing a process corresponding to the difference.

Handling operations of sound errors by sound error handling units 10 to 13 in base unit controller 6 and cordless handset controller 9 that have such function realizing units are described with reference to FIG. 5 to FIG. 9.

Figure 5:
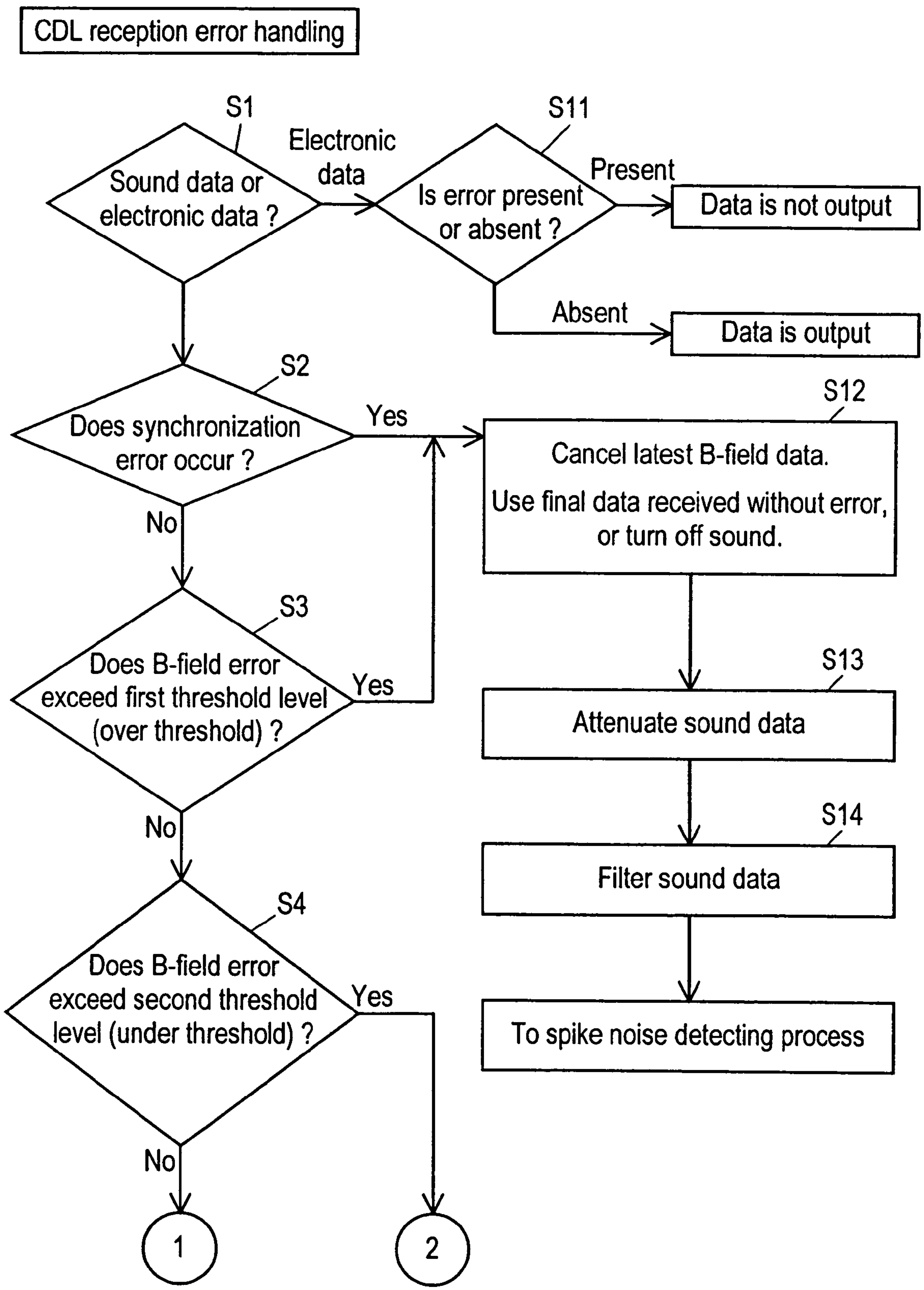
FIG. 5 is a part of a flow chart of a reception error handling of a cordless phone (CDL) of the radio communication apparatus in accordance with the exemplary embodiment 1.
Figure 6:
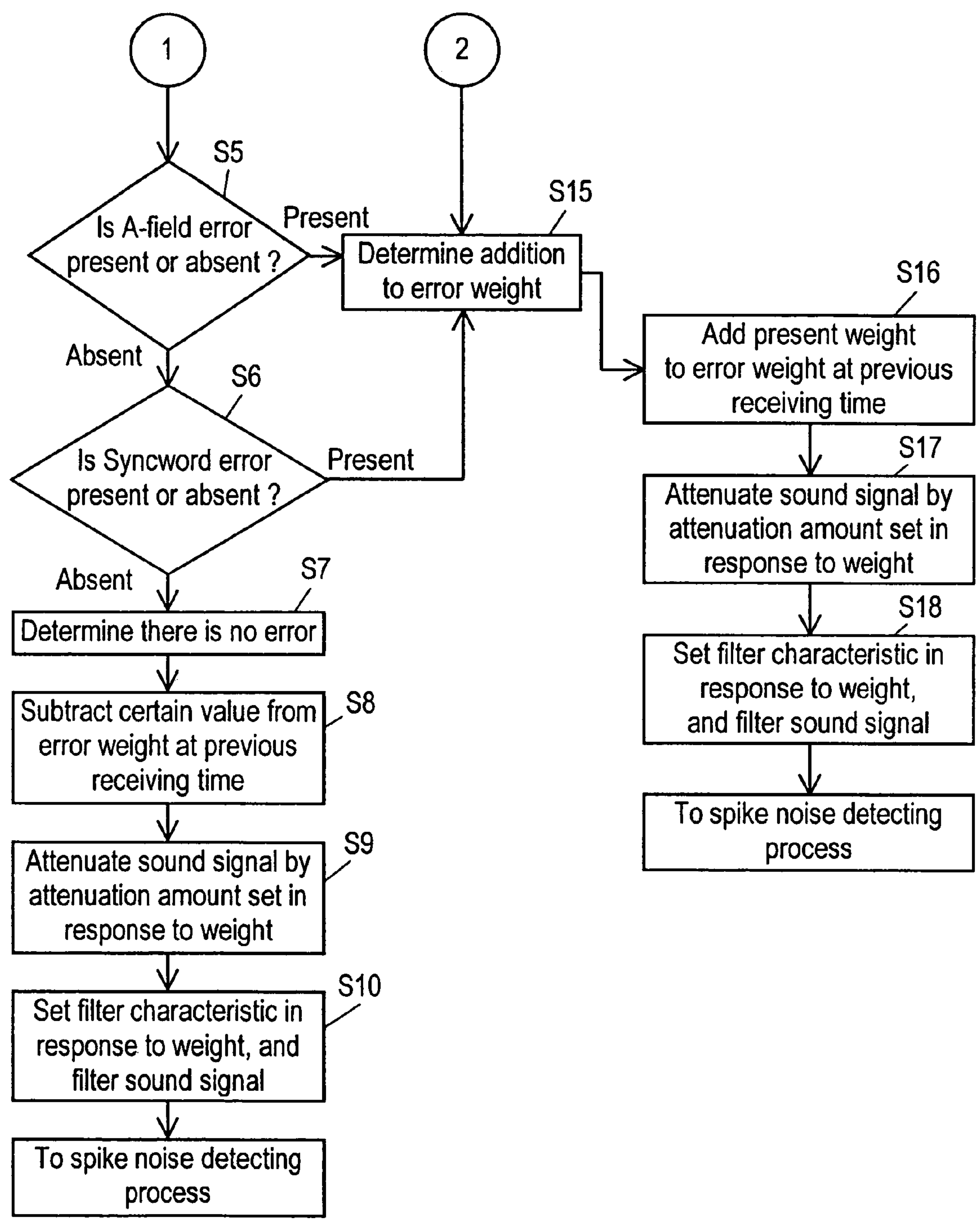
FIG. 6 is another part of a flow chart of the reception error handling of the CDL of the radio communication apparatus in accordance with the exemplary embodiment 1.

CDL reception error handling is firstly described. In FIG. 5 and FIG. 6, CDL reception error handling unit 41 performs CDL reception error handling.

Sound/data discriminator 51 discriminates whether received data is sound data or electronic data (S1). When the received data is determined to be sound data in step S1, error determining unit 52 determines whether or not a synchronization error occurs (S2). Error determining unit 52 determines whether or not a B-field error in the CDL data format exceeds a first threshold level (over threshold) (S3). When the synchronization error occurs or the B-field error exceeds the first threshold level, the process proceeds to step S12.

When no synchronization error occurs in step S2 and the B-field error does not exceed the first threshold level in step S3, the process proceeds to step S4. In step S4, error determining unit 52 determines whether or not the B-field error exceeds a second threshold level (under threshold) lower than the first threshold level. The process proceeds to step S15 when the B-field error exceeds it, and proceeds to step S5 when the B-field error does not exceed it.

In step S5, error determining unit 52 determines the presence or absence of an A-field error. When an A-field error exists, the process proceeds to step S15. When no A-field error exists, error determining unit 52 determines the presence or absence of a Syncword error (S6). When a Syncword error exists, the process proceeds to step S15. When no Syncword error exists, error determining unit 52 determines there is no error (S7), and the process proceeds to step S8.

In other words, the process proceeds to step S15 when the error level is high or a Syncword error exists, specifically:

when the B-field error exceeds the second threshold level in step S4;

when the presence of the A-field error is determined in step S5; or when the presence of the Syncword error is determined in step S6.

In step S15, any of the cases discussed above is determined to be satisfied, and the process proceeds to step S16. Error weight processor 54 adds the present weight to the weight of the sound error at the previous receiving time (S16). Error weight processor 54 attenuates sound signals in response to the weight resulted from the addition (S17), sets a coefficient of the filter in response to the weight, and filters the sound signals (S18). The process then proceeds to a spike noise detecting process in FIG. 9. Thus, when the error level is large or a Syncword error exists, step S15 or later are performed. The longer these states continue, the larger sound error weight becomes.

When the error level is considerably low and no Syncword error exists, step S8 or later are performed. In step S8, error weight processor 54 subtracts a certain value from the weight of the sound error at the previous receiving time. Error weight processor 54 attenuates sound signals with attenuators (not shown) in sound error handling units 10 to 13 in response to the weight resulted from the subtraction (S9). Error weight processor 54 sets coefficients of filters (not shown) of sound error handling units 10 to 13 in response to the resulted weight for filtering (S10). The process then proceeds to the spike noise detecting process in FIG. 9. The longer these states continue, the smaller sound error weight becomes.

When a synchronization error occurs in step S2 or the B-field error exceeds the first threshold level in step S3, error handling unit 53 cancels the latest B-field error, and uses the sound data last received without error (S12). In this case, the sound can be turned off. The sound data to be used is attenuated (S13), and the attenuated sound data is filtered (S14). The process then proceeds to the spike noise detecting process in FIG. 9. When such a fatal error occurs, the B-field data at this time is cancelled and replaced with the sound data received without error at the previous receiving time, or the sound is turned off.

When the received data is determined to be electronic data in step S1, the data is not output if error determining unit 52 determines the presence of an error, and the data is output if the unit determines the absence of the error (S11).

Figure 7:
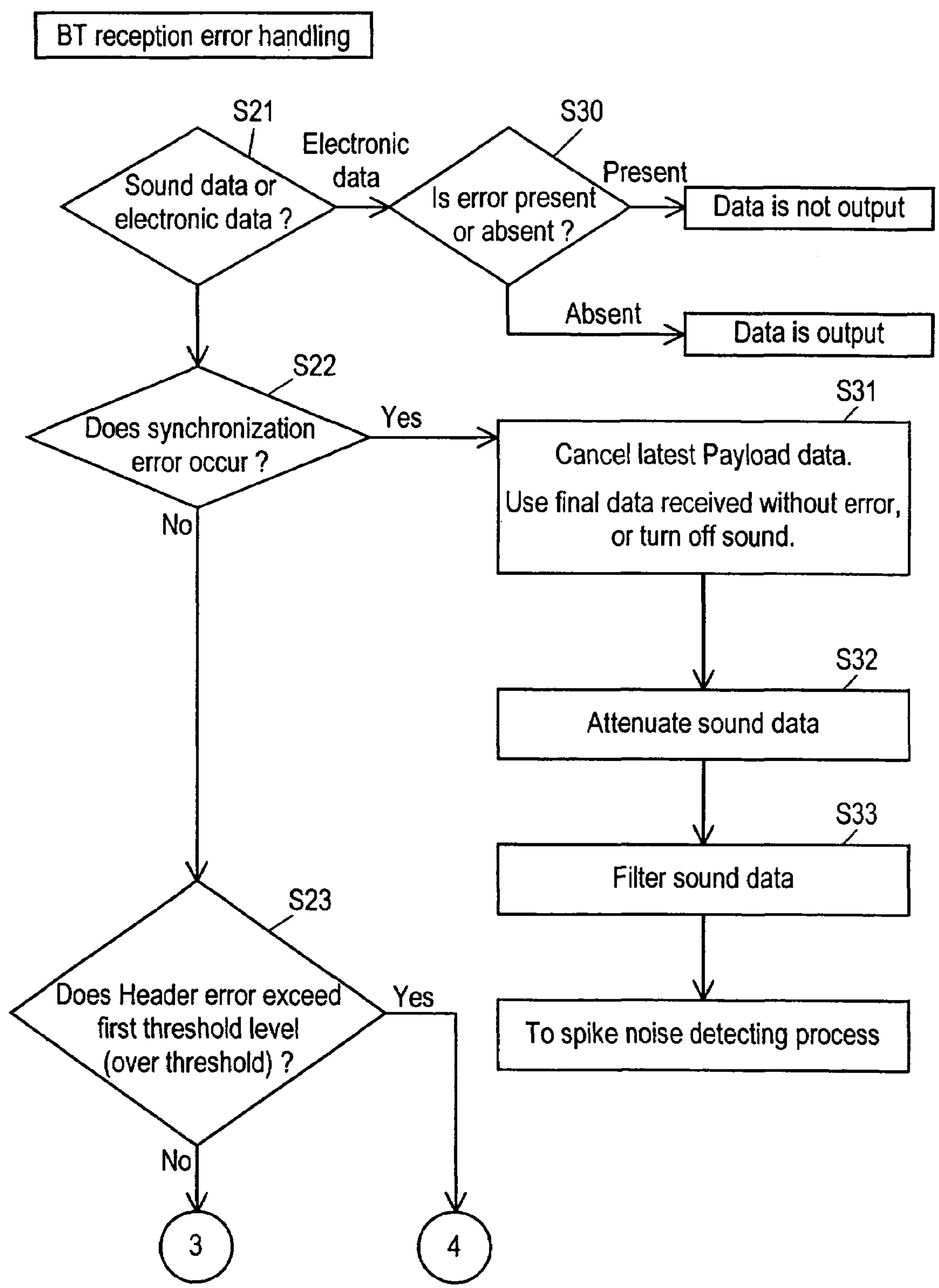
FIG. 7 is a part of a flow chart of a Bluetooth (BT) reception error handling of the radio communication apparatus in accordance with the exemplary embodiment 1.
Figure 8:
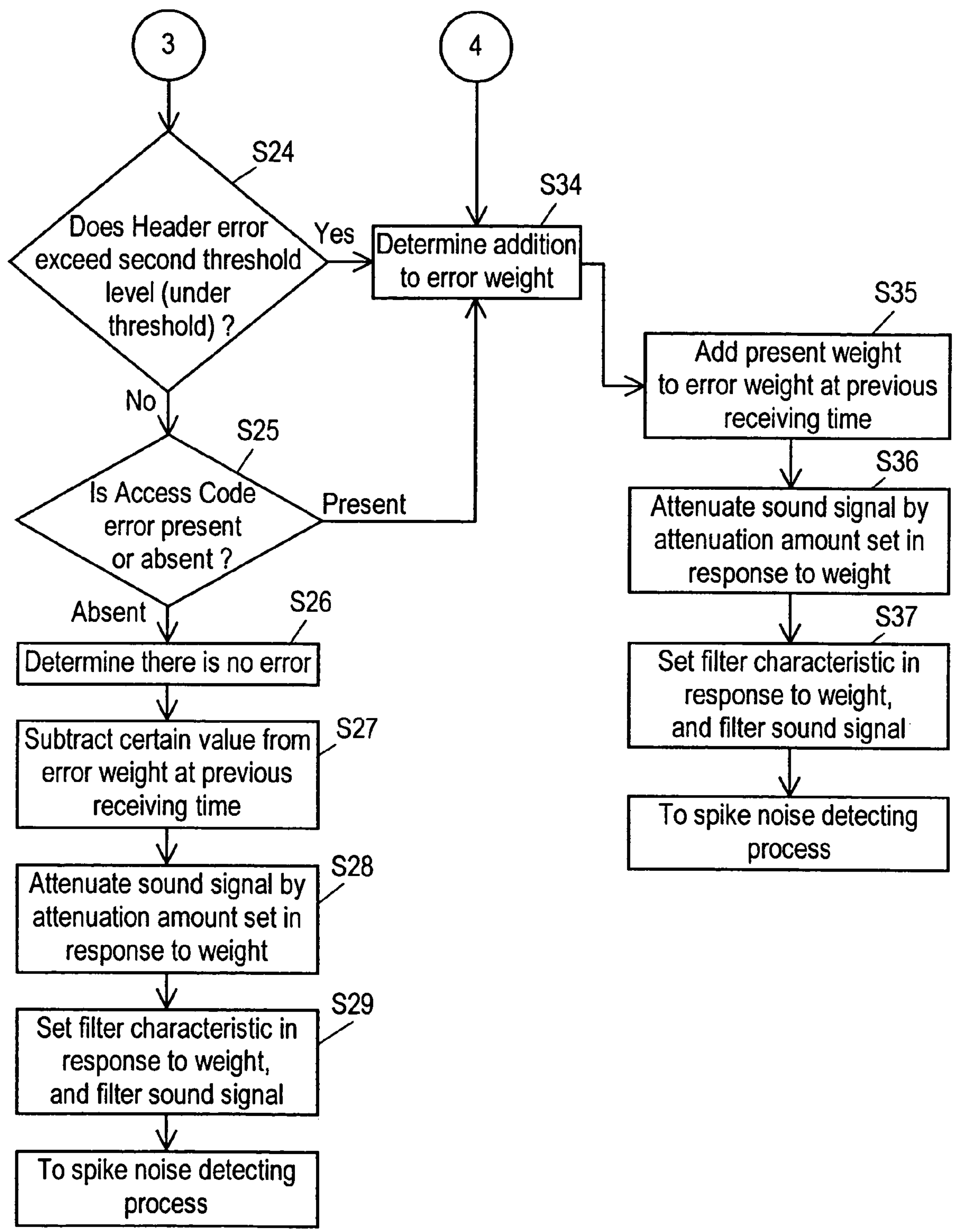
FIG. 8 is another part of a flow chart of the BT reception error handling of the radio communication apparatus in accordance with the exemplary embodiment 1.

In FIG. 7 and FIG. 8, BT reception error handling unit 42 performs BT reception error handling.

Sound/data discriminator 51 discriminates whether received data is sound data or electronic data (S21). When the received data is sound data, error determining unit 52 determines whether or not a synchronization error occurs (S22). When a synchronization error occurs, the process proceeds to step S31.

When no synchronization error occurs, error determining unit 52 determines whether or not a Header error in the BT data format exceeds a first threshold level (over threshold) (S23). The process proceeds to step S34 when the Header error exceeds the first threshold level, and proceeds to step S24 when the Header error does not exceed the first threshold level.

In step S24, error determining unit 52 determines whether or not the Header error exceeds a second threshold level (under threshold) lower than the first threshold level. The process proceeds to step S34 when the Header error exceeds it, and proceeds to step S25 when the Header error does not exceed it. In step S25, error determining unit 52 determines the presence or absence of an Access Code error. When an Access Code error exists, the process proceeds to step S34. When no Access Code error exists, error determining unit 52 determines there is no error (S26), and the process proceeds to step S27.

In other words, the process proceeds to step S34 when the error level is high or an Access Code error exists, specifically:

when the Header error exceeds the first threshold level in step S23;

when the Header error exceeds the second threshold level in step S24; or when an Access Code error exists in step S25.

In step S34, it is determined that any of the cases discussed above is satisfied, and the process proceeds to step S35. Error weight processor 54 adds the present weight to the weight of the sound error at the previous receiving time (S35). Error weight processor 54 attenuates sound signals in response to the weight resulted from the addition (S36), sets a coefficient of the filter in response to the weight, and filters the sound signals (S37). The process then proceeds to the spike noise detecting process in FIG. 9. The longer these states continue, the larger sound error weight becomes.

When the error level is considerably low and no Access Code error exists, the process proceeds to step S27. In step S27, error weight processor 54 subtracts a certain value from the weight of the sound error at the previous receiving time. Error weight processor 54 attenuates sound signals with attenuators in sound error handling units 10 to 13 in response to the weight resulted from the subtraction (S28), sets coefficients of filters of sound error handling units 10 to 13 in response to the weight, and filters the sound signals (S29). The process then proceeds to the spike noise detecting process in FIG. 9. Step S27 or later are executed in that manner. The longer these states continue, the smaller sound error weight becomes.

When a synchronization error is determined to occur in step S22, error handling unit 53 cancels the latest Payload data (see FIG. 10), and uses sound data last received without error (S31). In this case, the sound can be turned off. The sound data to be used is attenuated (S32), and the attenuated sound data is filtered (S33). The process then proceeds to the spike noise detecting process in FIG. 9. In other words, when a synchronization error occurs, the Payload data at this time is cancelled and replaced with the sound data received without error at the previous receiving time, or the sound is turned off.

When the received data is determined to be electronic data in step S21, the data is not output if error determining unit 52 determines the presence of an error, and the data is output if the unit determines the absence of the error (S30).

Figure 9:
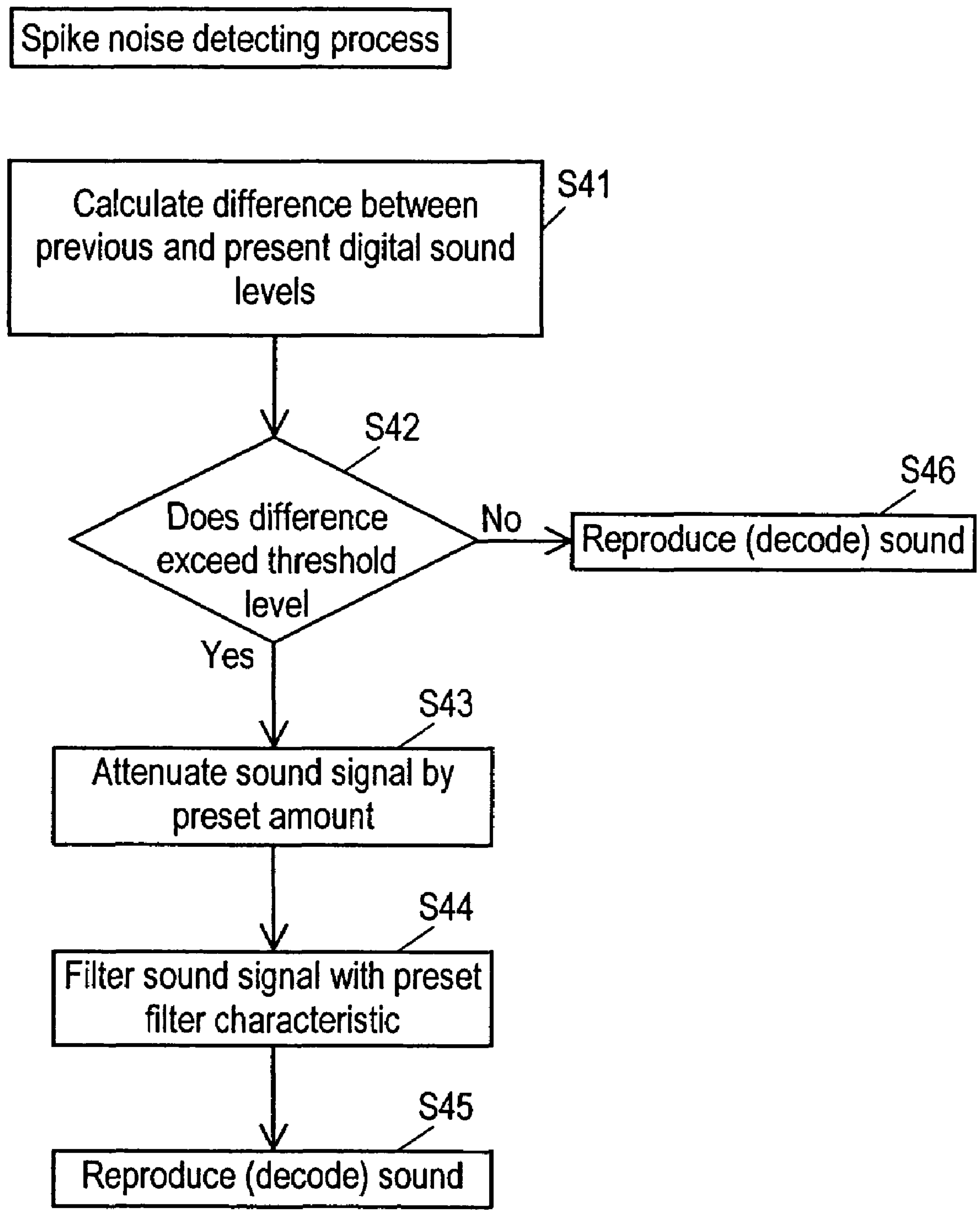
FIG. 9 is a flow chart of a spike noise detecting process of the radio communication apparatus in accordance with the exemplary embodiment 1.

In FIG. 9, spike noise detection processor 43 performs the spike noise detecting process.

Firstly, difference calculator 55 digitally calculates difference between the previous sound level and the present sound level (S41). Difference determining unit 56 then determines whether or not the difference calculated in step S41 exceeds a predetermined threshold level (S42). When the difference is determined to exceed it, the present sound signals are attenuated by a preset attenuation amount (attenuation amount of the attenuators of sound error handling units 10 to 13) (S43). The attenuated sound signals are filtered with a preset filter characteristic (S44), and a sound is reproduced (S45). When the difference determining unit determines that the difference calculated in step S41 does not exceed the predetermined threshold level (S42), a sound is reproduced as it is (S46).

In the CDL data format, a conventional CRC has four bits, but the CRC of the present embodiment has 60 bits as shown in FIG. 11. When the number of bits in the CRC is increased, a precise handling of the sound error can be realized as shown in FIG. 5 to FIG. 9.

In the radio communication apparatus of the present embodiment, as discussed above, a first radio communication or a second radio communication is simply discriminated based on data contents of a synchronizing signal. When synchronism discriminator 5 determines that the synchronizing signal is in the CDL mode, radio signals received by a radio unit are processed in compliance with the CDL standard. When synchronism discriminator 5 determines that the synchronizing signal is in the BT mode, the radio signals are processed in compliance with the BT standard. In this structure, the radio unit (receiver/transmitter) can be formed with a single apparatus. The single receiver can receive both of the BT radio signals and the CDL radio signals, and the single transmitter can transmit both of the BT radio signals and the CDL radio signals. Therefore, a plurality of radio units (receiver/transmitter) corresponding to the kinds of the radio signals are not required, and an accommodating space of the transmitter and receiver in the radio communication apparatus can be smaller. A number of components can be decreased.

The radio communication apparatus of the present embodiment has slot counters 30, 31 for counting clocks for determining time positions of slots in CDL mode and BT mode, respectively. RAM 34 stores the discrimination result of synchronism discriminator 5 and values of slot counters 30, 31. In this structure, the radio unit (receiver/transmitter) does not need to perform the synchronization process, and the single radio unit can be shared by a plurality of radio communication standards.

Synchronism discriminator 5 is formed of hardware and discriminates radio signals corresponding to the plurality of radio communication standards. The radio communication apparatus has controllers 6, 9 for performing process with software in response to the discrimination result of synchronism discriminator 5. This structure allows extremely accurate discrimination.

The radio communication apparatus also has synchronism discriminator 5, and controllers 6, 9 for performing the process with the software in response to the discrimination result of synchronism discriminator 5 and detecting a type and a weight of a sound error. This structure allows the detection of a type and a weight of a sound error, so that the sound error can be handled in response to the detection result. In sound error handling, the present sound error weight is added to or subtracted from the previous sound error weight depending on the degree of the present sound error, and depth of the sound error handling is changed in response to the sound error weight after the addition or the subtraction. Thus, the sound error can be precisely handled to improve quality of the sound signals. In the sound error handling, a sound signal from which the sound error is detected is attenuated in response to the sound error weight and this sound signal is filtered. Thus, the sound signal including the sound error is adequately processed to improve the quality.

The radio communication apparatus has spike noise detection processor 43 for applying a predetermined process to the sound signal from which spike noise is detected. This structure allows not only the detection of the type and the weight of the sound error but also the detection of a spike noise. A process in response to the detection results can be performed.

Spike noise detection processor 43 determines there is a spike noise when a difference between the previous sound level and the present sound level exceeds a predetermined value. The sound signal including the spike noise is attenuated and is filtered. Thus, not only the sound signal including the sound error but also the sound signal including the spike noise is adequately processed, so that the quality of sound signals can be further improved.

Controllers 6, 9 detect a type and a weight of a sound error in the CDL mode when the radio communication standard signal is a CDL signal, and have CDL reception error handling unit 41 for performing a process corresponding to the detection result. Controllers 6, 9 detect a type and a weight of a sound error in the BT mode when the radio communication standard signal is a BT signal, and have BT reception error handling unit 42 for performing a process corresponding to the detection result. This structure allows the detection of a type and a weight of a sound error depending on each radio communication standard signal even when both a CDL signal and a BT signal exist as the radio communication standard signals, and allows a process corresponding to the detection result.

Exemplary Embodiment 2

A radio communication apparatus in accordance with exemplary embodiment 2 of the present invention will be described hereinafter. Basic structures of a base unit and a cordless handset of the radio communication apparatus are substantially similar to those of exemplary embodiment 1 shown in FIG. 1, and therefore not described. Operations of the base unit and the cordless handset that are common with those of exemplary embodiment 1 are not described either.

Operations of base unit controller 6 and cordless handset, controller 9 of exemplary embodiment 2 are described in detail with reference to FIG. 12 to FIG. 29.

Figure 12:
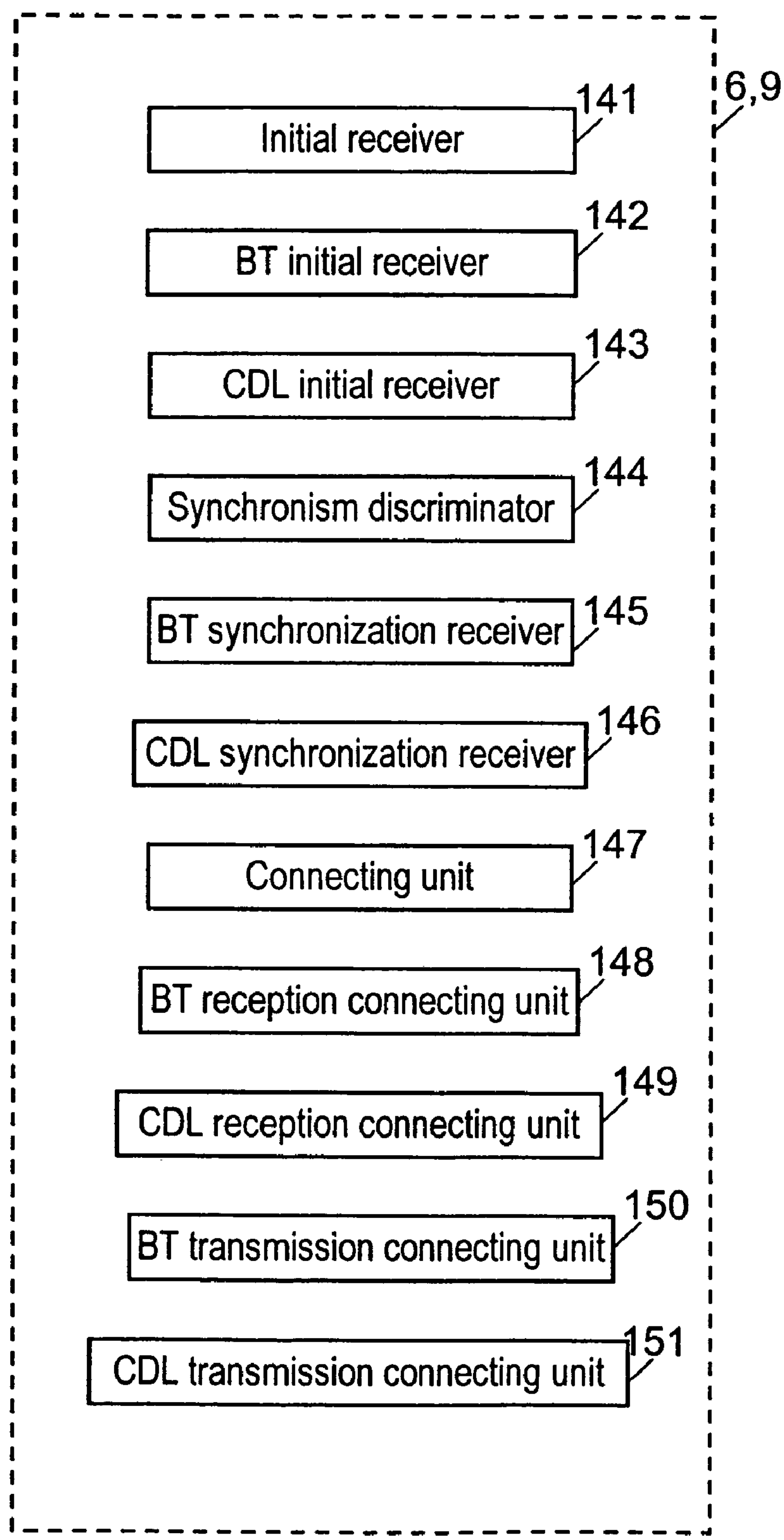
FIG. 12 is a function block diagram of process-by-process function realizing units in a base unit controller and a cordless handset controller of the radio communication apparatus in accordance with the exemplary embodiment 2 of the present invention.

In FIG. 12, each of base unit controller 6 and cordless handset controller 9 comprises the following process-by-process function realizing units:

initial receiver 141 for performing an initial receiving process;

Bluetooth (BT) initial receiver 142 for performing a BT initial receiving process;

cordless phone (CDL) initial receiver 143 for performing a CDL initial receiving process;

synchronism discriminator 144 for performing a synchronism discriminating process;

BT synchronization receiver 145 for performing a BT synchronization receiving process;

CDL synchronization receiver 146 for performing a CDL synchronization receiving process;

connecting unit 147 for performing a connecting process;

BT reception connecting unit 148 for performing a BT reception connecting process;

CDL reception connecting unit 149 for performing a CDL reception connecting process;

BT transmission connecting unit 150 for performing a BT transmission connecting process; and CDL transmission connecting unit 151 for performing a CDL transmission connecting process.

Figure 13:
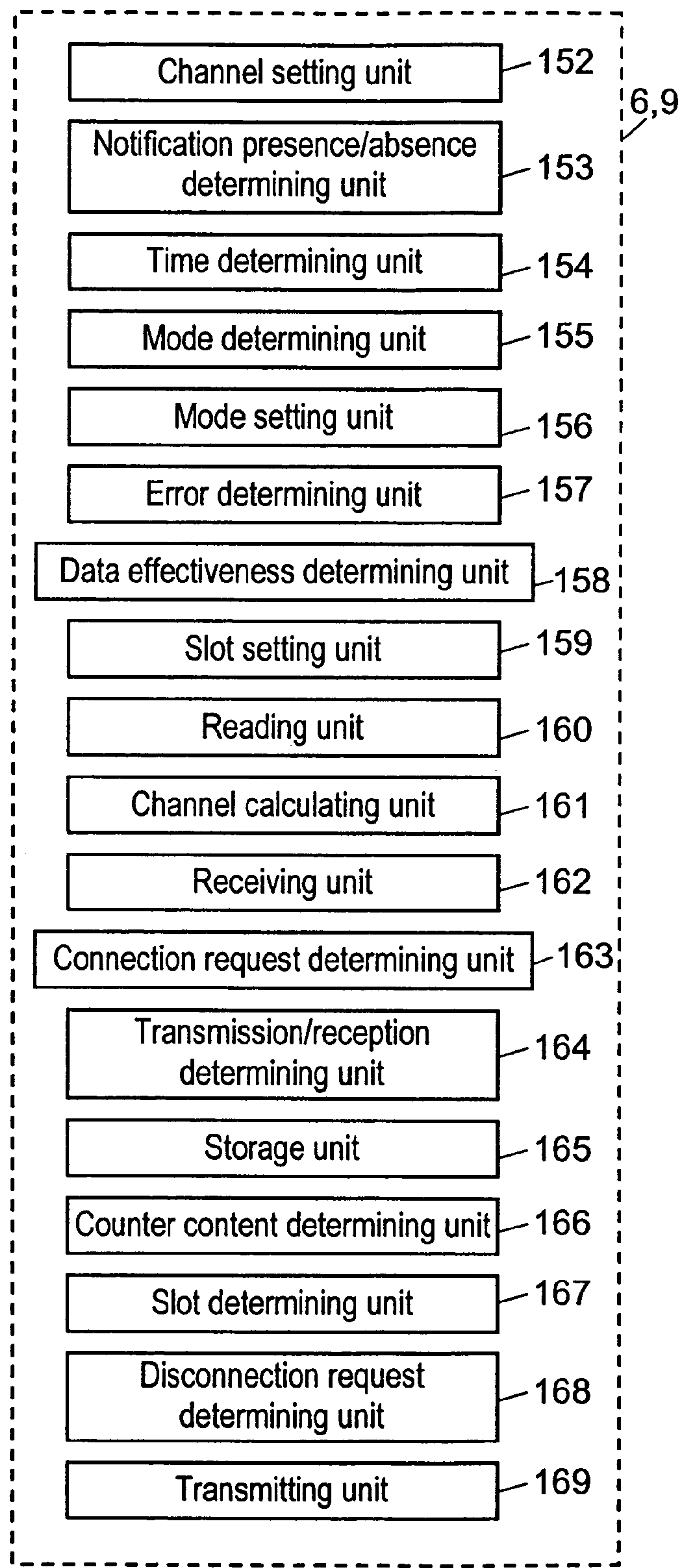
FIG. 13 is a function block diagram of step-by-step function realizing units in the base unit controller and the cordless handset controller of the radio communication apparatus m accordance with the exemplary embodiment 2.

In FIG. 13, each of base unit controller 6 and cordless handset controller 9 comprises the following step-by-step function realizing units:

channel setting unit 152 for setting a channel (namely, setting a frequency corresponding to an objective channel);

notification presence/absence determining unit 153 for determining whether or not notification is given from a radio communication apparatus on the other end of the line;

time determining unit 154 for determining an elapsed time or the like since a predetermined time;

mode determining unit 155 for determining a radio communication mode based on received synchronizing signal data;

mode setting unit 156 for setting a radio communication mode;

error determining unit 157 for determining the presence or absence of a communication error;

data effectiveness determining unit 158 for determining effectiveness of communication data;

slot setting unit 159 for setting a slot number to be communicated;

reading unit 160 for reading data out of a memory;

channel calculating unit 161 for calculating a channel number;

receiving unit 162 for receiving data;

connection request determining unit 163 for determining the presence or absence of a connection request;

transmission/reception determining unit 164 for determining transmission or reception;

storage unit 165 for storage;

counter content determining unit 166 for determining counter contents;

slot determining unit 167 for determining a CDL slot or a BT slot;

disconnection request determining unit 168 for determining the presence or absence of a disconnection request; and transmitting unit 169 for transmitting data.

Operations of base unit controller 6 and cordless handset controller 9 that have such function realizing units are described in detail with reference to FIG. 14 to FIG. 29.

Figure 14:
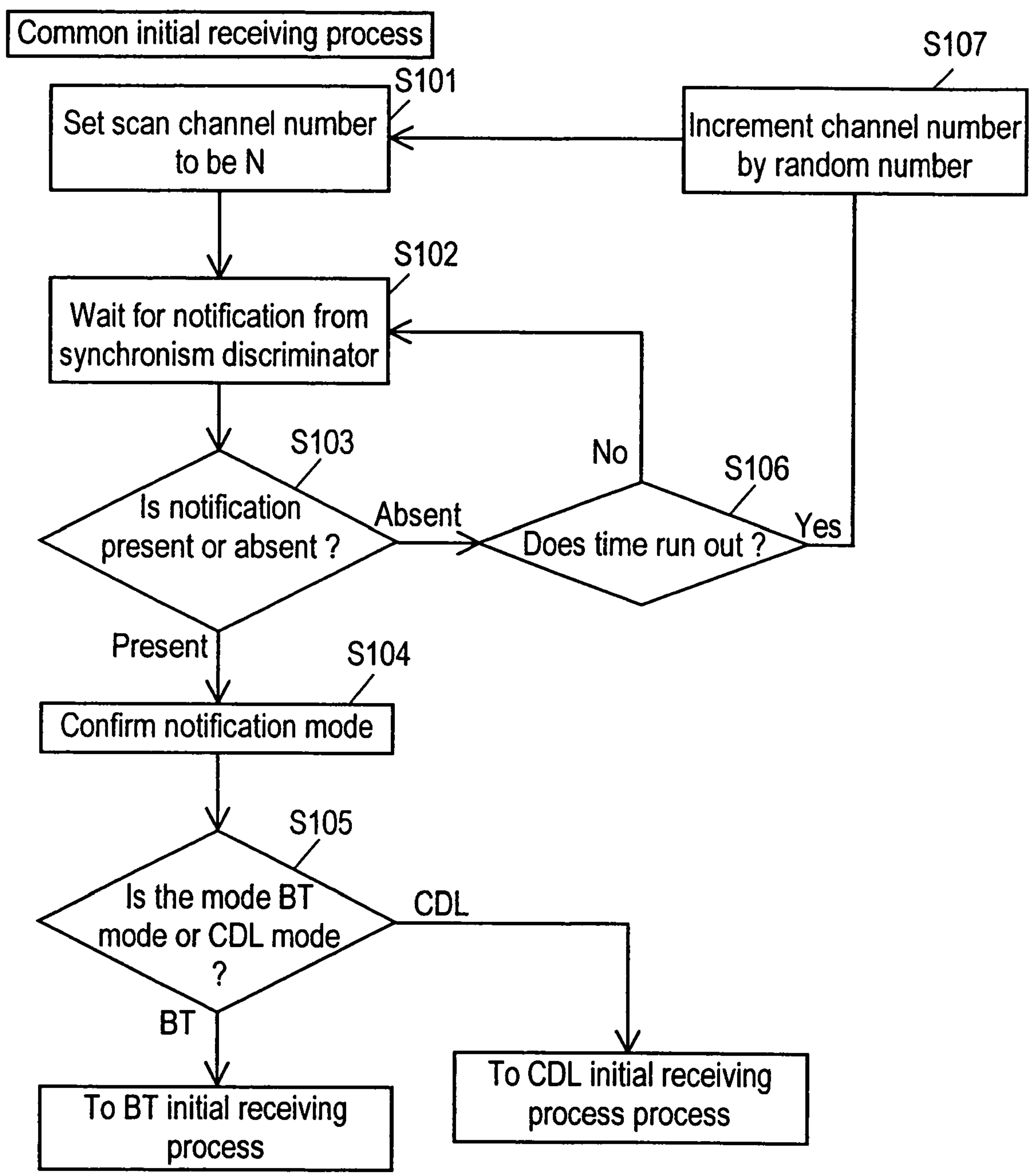
FIG. 14 is a flow chart of an initial receiving process of the radio communication apparatus in accordance with the exemplary embodiment 2.

In FIG. 14, initial receiver 141 performs an initial receiving process.

Channel setting unit 152 sets a scan channel number to be N (S101). Notification presence/absence determining unit 153 determines the presence or absence of notification from synchronism discriminator 5 (S102 and S103). When the presence of the notification is determined, mode determining unit 155 determines whether the mode of the notification is BT or CDL (S104 and S105). The process proceeds to the BT initial receiving process in FIG. 15 when the mode of the notification is BT, and proceeds to the CDL initial receiving process in FIG. 16 when the mode of the notification is CDL. When the absence of notification from synchronism discriminator 5 is determined in step S103 and time determining unit 154 determines a predetermined time elapses since the reception of channel N (S106), the channel number is changed (S107) and the process returns to step S101.

Figure 15:
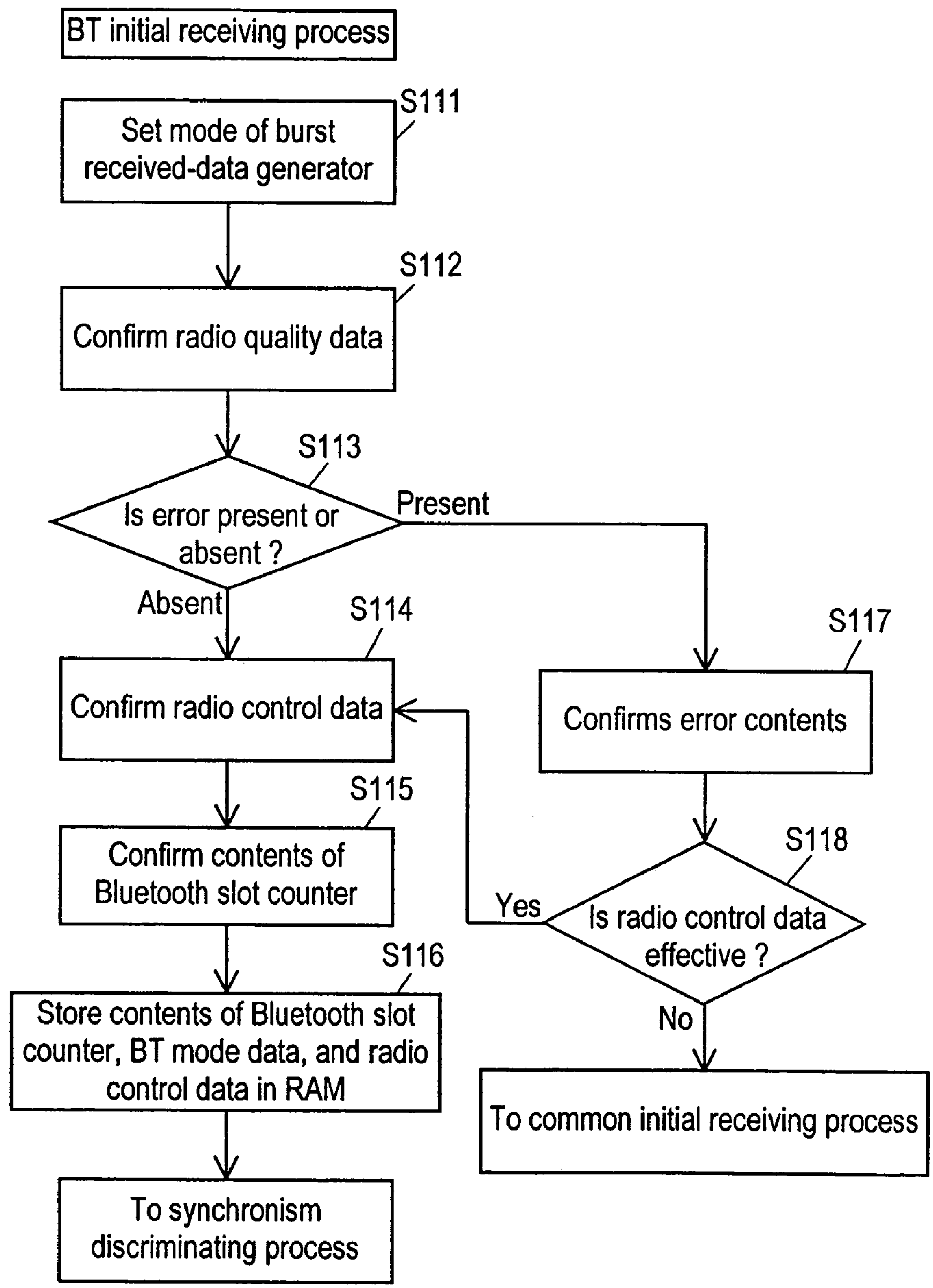
FIG. 15 is a flow chart of a BT initial receiving process of the radio communication apparatus in accordance with the exemplary embodiment 2.

In FIG. 15, BT initial receiver 142 performs a BT initial receiving process.

Mode setting unit 156 sets a mode of burst received-data generator 4 based on the notification from synchronism discriminator 5 (S111). Error determining unit 157 determines the presence or absence of an error based on radio quality data 202 (S112 and S113). When the absence of the error is determined, storage unit 165 confirms radio control data 201 (Header and Payload in FIG. 30A) and contents of Bluetooth slot counter 31, and stores them and BT mode data indicating the BT mode in RAM 34 (S114, S115, and S116). The process then proceeds to a synchronism discriminating process in FIG. 17. When the presence of the error is determined in step S113, data effectiveness determining unit 158 confirms error contents (S117). The process proceeds to step S114 when radio quality data 202 is determined to be effective, and returns to the initial receiving process in FIG. 14 when its ineffectiveness is determined (S118).

Figure 16:
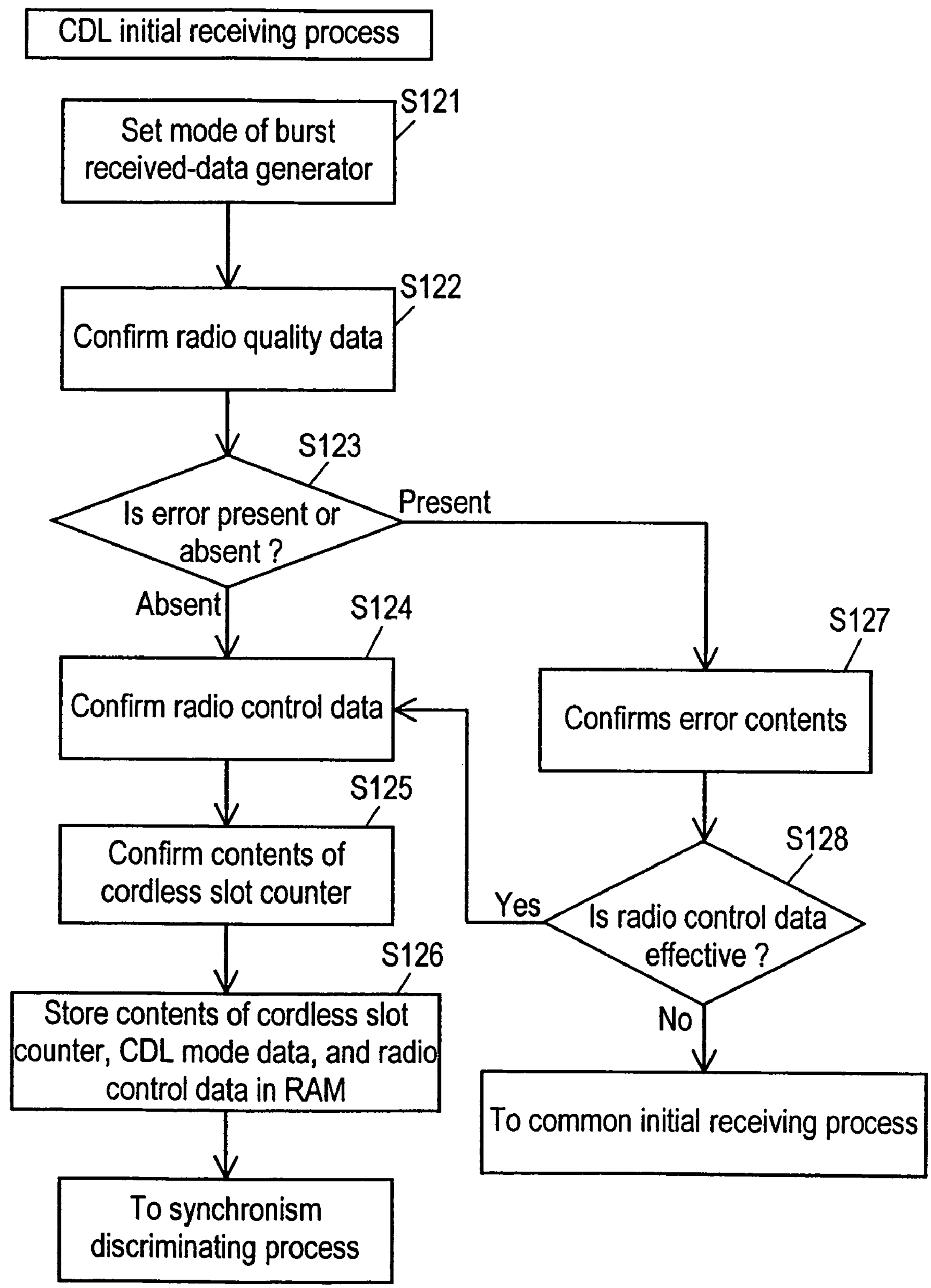
FIG. 16 is a flow chart of a CDL initial receiving process of the radio communication apparatus in accordance with the exemplary embodiment 2.

In FIG. 16, CDL initial receiver 143 performs a CDL initial receiving process.

Mode setting unit 156 sets a mode of burst received-data generator 4 based on the notification from synchronism discriminator 5 (S121). Error determining unit 157 determines the presence or absence of an error based on radio quality data 202 (S122 and S123). When the absence of the error is determined, storage unit 165 confirms radio control data 201 (A-field in FIG. 30B) and contents of cordless slot counter 30, and stores them and CDL mode data indicating the CDL mode in RAM 34 (S124, S125, and S126). The process then proceeds to a synchronism discriminating process in FIG. 17. When the presence of the error is determined in step S123, data effectiveness determining unit 158 confirms error contents (S127). The process proceeds to step S124 when radio quality data 202 is determined to be effective, and returns to the initial receiving process in FIG. 14 when its ineffectiveness is determined (S128).

Figure 17:
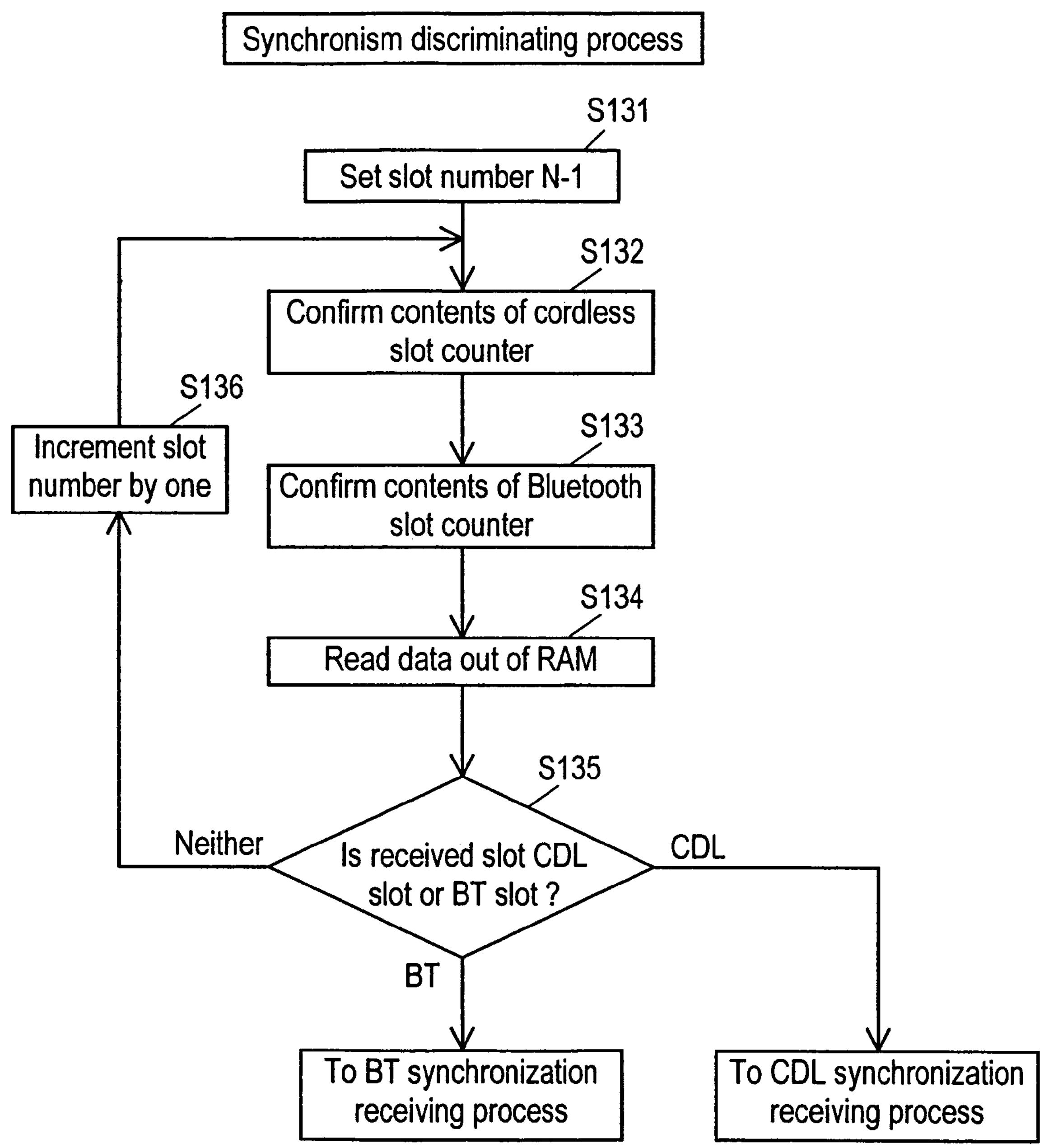
FIG. 17 is a flow chart of a synchronism discriminating process of the radio communication apparatus in accordance with the exemplary embodiment 2.

In FIG. 17, synchronism discriminator 144 performs a synchronism discriminating process.

In the synchronism discriminating process, synchronism discriminator 144 determines whether the present receiving signal synchronizes in compliance with the cordless phone (CDL) standard or the Bluetooth (BT) standard. For more certain determination, the synchronism discriminating process is started from receiving information of the slot just before the receiving signal.

Slot number N-1 just before slot number N at the present time, is set to slot setting unit 159 (S131). Counter content determining unit 166 determines contents of cordless slot counter 30 and Bluetooth slot counter 31 in slot number N-1 (S132 and S133). Reading unit 160 reads CDL and BT data formats out of RAM 34 (S134).

Slot determining unit 167 determines whether the received slot is a CDL slot or a BT slot based on the determination results of slot counters 30, 31 and the contents read out of RAM 34 (S135). In other words, based on the count values of counter 30 and counter 31 that are read out of RAM 34 and information indicating CDL or BT, slot determining unit 167 determines whether or not the slot of present number N is a received slot with a timing truly assigned to the terminal (base unit or cordless handset). When the information read out of RAM 34 indicates CDL and the present received slot (number N) is the received slot with the timing truly assigned to the terminal, the process proceeds to the CDL synchronization receiving process in FIG. 20 and FIG. 21. When the information read out of RAM 34 indicates BT and the present received slot is the received slot with the timing truly assigned to the terminal, the process proceeds to the BT synchronization receiving process in FIG. 18 and FIG. 19.

When it is determined that neither is satisfied in step S135 in the synchronism discriminating process, the slot number is incremented by one, and then the process proceeds to step S132 (S136). Slot determining unit 167 repeats the slot determining operations while incrementing the slot number by one, until the present slot is determined to be a BT slot or a CDL slot.

Figure 30A:
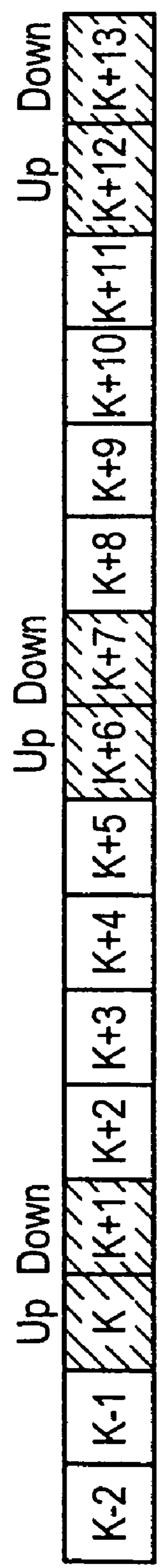
FIG. 30A is a slot diagram of the BT mode of the radio communication apparatus in accordance with the exemplary embodiment 2.
Figure 30B:
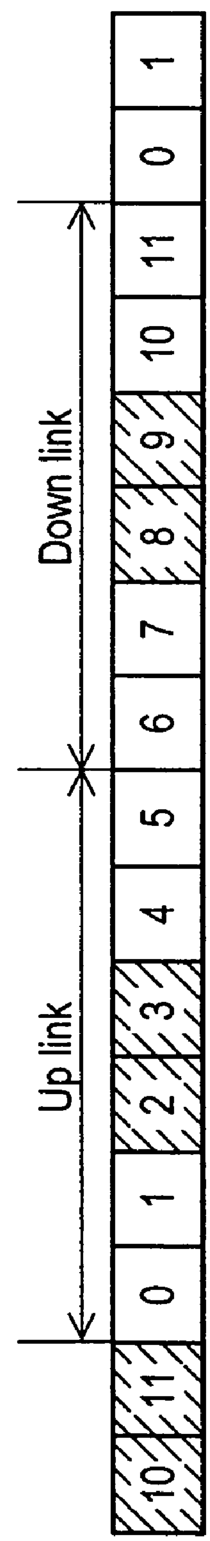
FIG. 30B is a slot diagram- of the CDL mode of the radio communication apparatus in accordance with the exemplary embodiment 2.

In FIG. 30A and FIG. 30B, the Bluetooth (BT) mode slot and the cordless phone (CDL) mode slot in a communication connection in the radio unit in transmission or reception are described. In FIG. 30A, BT is operated in HV3 mode (HV: sound mode, and 3: communication every three slots). Slots shown by oblique lines transmit or receive signals in FIG. 30A and FIG. 30B.

In FIG. 30A, when certain slot “K” is a received slot for a first BT communication, next slot “K+1” is a transmitted slot for the first BT communication. When subsequent slot “K+6” is the next received slot for the first BT communication, slot “K+7” is the next transmitted slot for the first BT communication.

In FIG. 30B, when slot “2” is a received slot for a first CDL communication, slot “3” is a received slot for a second CDL communication. When slot “8” is a transmitted slot for the first CDL communication, slot “9” is a transmitted slot for the second CDL communication. The BT and CDL communications do not use the same slot simultaneously and can be executed in parallel in a time-sharing manner as shown in FIG. 30A and FIG. 30B. A pair of BT radio communications are performed using four slots in one frame of the CDL mode, and two pairs of CDL radio communications are performed using four slots in one frame.

Figure 31A:
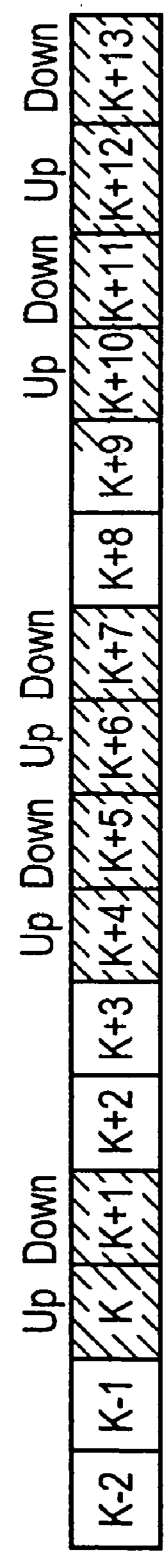
FIG. 31A is a slot diagram of the BT mode of the radio communication apparatus in accordance with the exemplary embodiment 2.
Figure 31B:
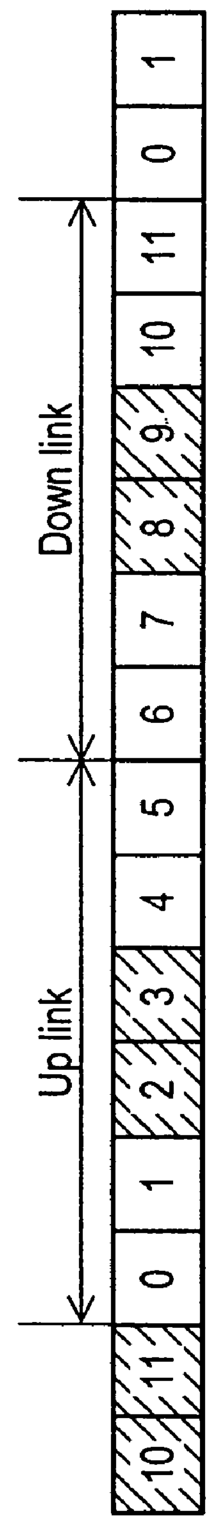
FIG. 31B is a slot diagram of the CDL mode of the radio communication apparatus in accordance with the exemplary embodiment 2.

FIG. 31A and FIG. 31B show a case when using slots in the BT mode is increased. FIG. 31A shows slots in the BT mode, and FIG. 31B shows slots in the CDL mode. As shown in FIG. 31A and FIG. 31B, the BT and CDL communications do not use the same slot simultaneously and can be executed in parallel in a time-sharing manner similarly to the case in FIG. 30A and FIG. 30B. In FIG. 31A and FIG. 31B, two pairs of BT radio communications are performed using eight slots in one frame of the CDL mode, and two pairs of CDL radio communications are performed using four slots in one frame.

For interactive communication, both a transmitted slot and a received slot must be used. As shown in FIG. 30A, FIG. 30B, FIG. 31A, and FIG. 31B, the BT communication uses adjacent transmitted slot and received slot every six slots, and the CDL communication uses the transmitted slot and received slot alternately every six slots. These slot arrangements allow effective use of the slots. In the BT mode three interactive communications at the maximum are allowed, and in the CDL mode six interactive communications at the maximum, namely two times more than the BT mode, are allowed in the present embodiment.

Figure 18:
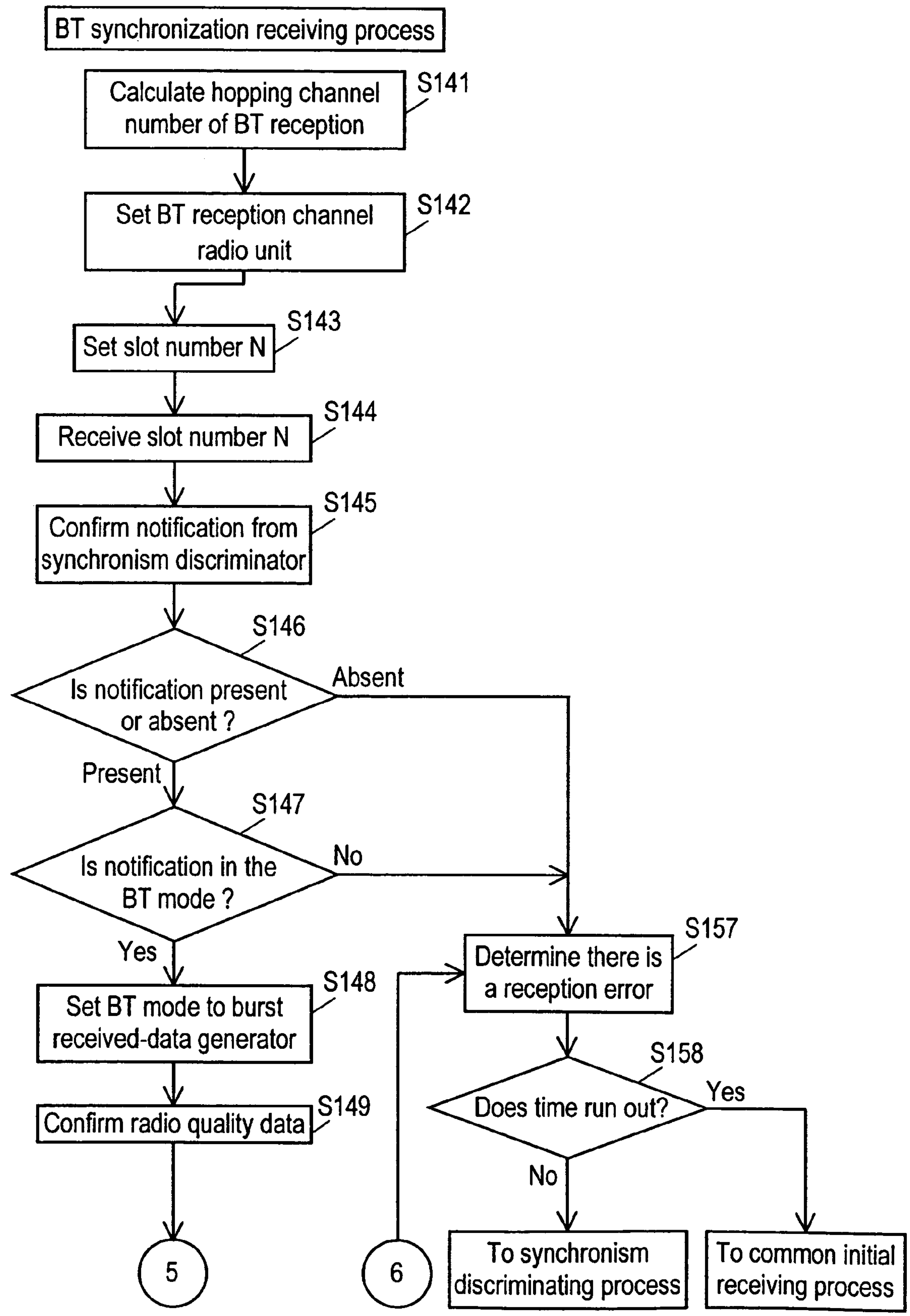
FIG. 18 is a part of a flow chart of a BT synchronization receiving process of the radio communication apparatus in accordance with the exemplary embodiment 2.
Figure 19:
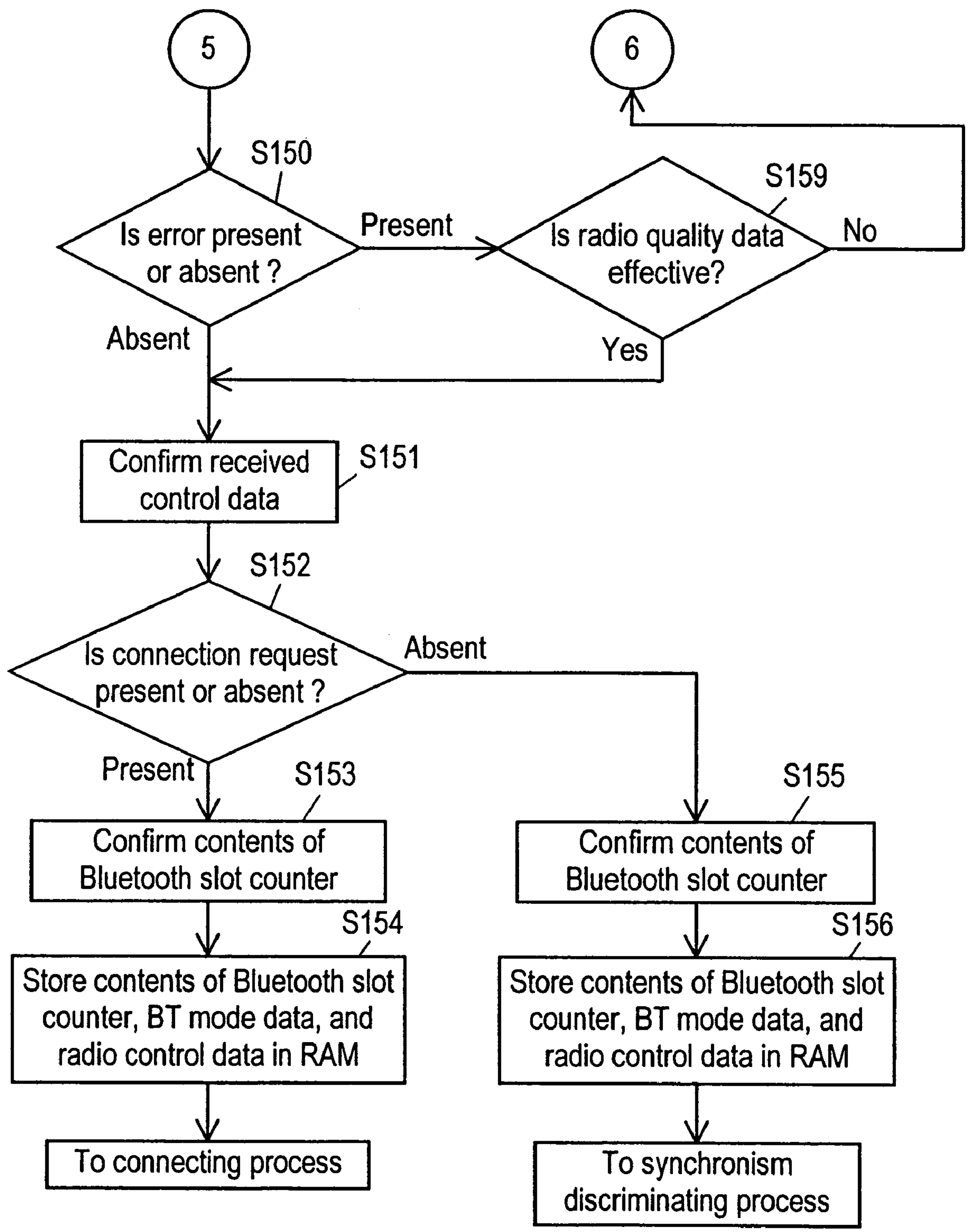
FIG. 19 is another part of a flow chart of the BT synchronization receiving process of the radio communication apparatus in accordance with the exemplary embodiment 2.

In FIG. 18 and FIG. 19, BT synchronization receiver 145 performs a BT synchronization receiving process.

Channel calculating unit 161 calculates a random hopping channel number to be generated from a BT device address and a BT clock (S141). Channel setting unit 152 sets a Bluetooth reception channel number calculated in step S141 to frequency synthesizer 8 (S142). Next, slot setting unit 159 sets a slot number, for example, number N set in FIG. 17 (S143). Receiving unit 162 receives slot number N (S144), and notification presence/absence determining unit 153 determines the presence or absence of notification from synchronism discriminator 5 (S145 and S146). When the notification is determined to be present, it is determined whether or not the notification is in the BT mode (S147). When the notification is in the BT mode, mode setting unit 156 sets the BT mode to burst received-data generator 4 (S148). Error determining unit 157 then determines the presence or absence of an error based on received radio quality data 202 (S149 and S150). When the absence of the error is determined, connection request determining unit 163 determines the presence or absence of a connection request based on radio control data 201 (S151 and S152). When the connection request is present, counter content determining unit 166 confirms contents of Bluetooth slot counter 31 (S153). Storage unit 165 inputs the contents of Bluetooth slot counter 31, mode data indicating the BT mode, and radio control data 201 into RAM 34 (S154). The process then proceeds to a connecting process in FIG. 22. When the connection request is absent, counter content determining unit 166 confirms contents of Bluetooth slot counter 31 (S155), storage unit 165 inputs the contents of Bluetooth slot counter 31, mode data indicating the BT mode, and radio control data 201 into RAM 34 (S156). The process then proceeds to the synchronism discriminating process in FIG. 17. When the notification is determined to be absent in step S146 or the notification is not in the BT mode in step S147, error determining unit 157 determines there is a reception error (S157). Time determining unit 154 then determines whether or not a predetermined time elapses since the reception of slot number N (S158). The process proceeds to the synchronism discriminating process in FIG. 17 when the predetermined time does not elapse, and returns to the common initial receiving process when the predetermined time elapses. When the presence of the error is determined in step S150, the process proceeds to step S159. The process proceeds to step S151 when radio quality data 202 is effective, and to step S157 when radio quality data 202 is ineffective.

Figure 20:
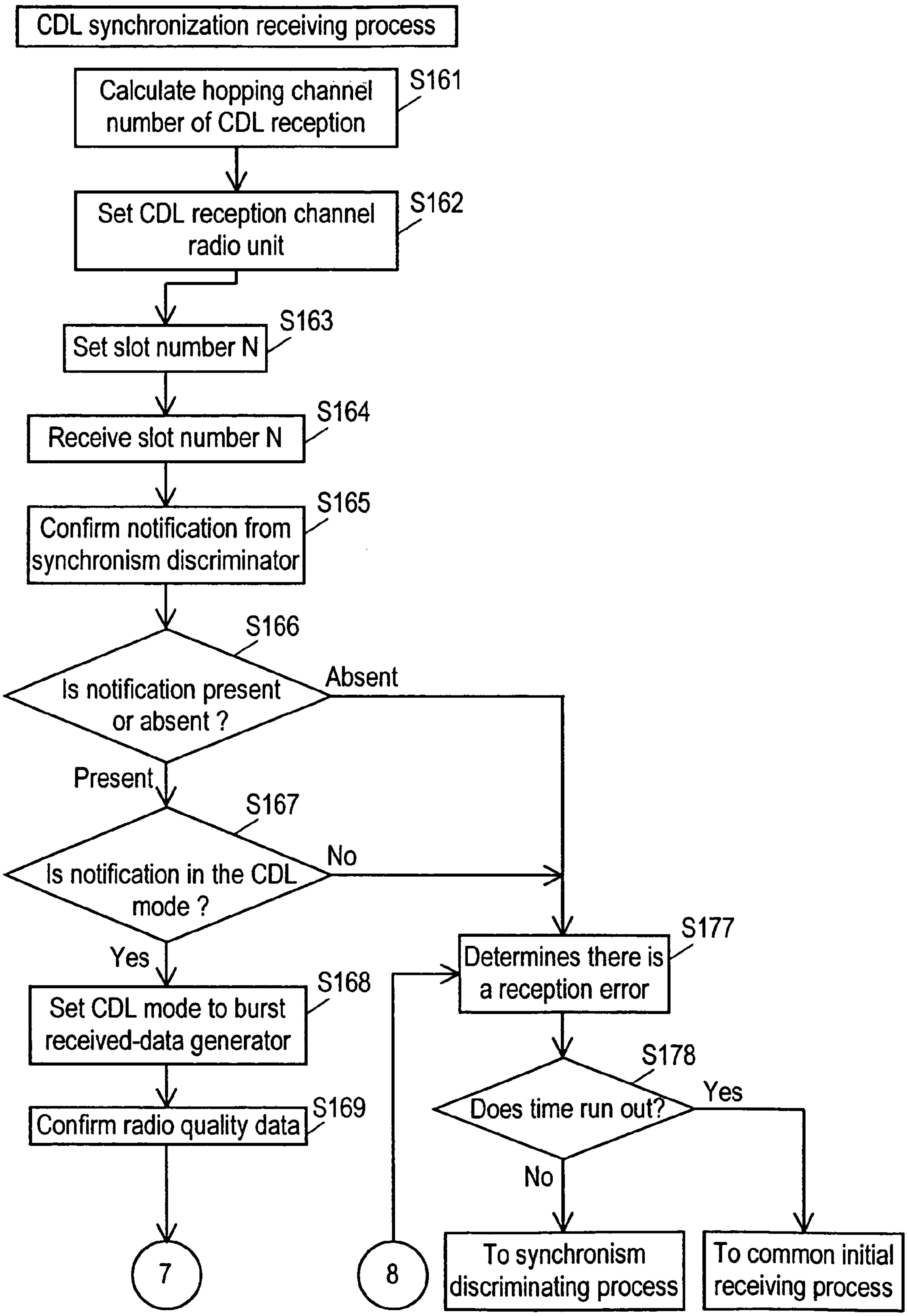
FIG. 20 is a part of a flow chart of a CDL synchronization receiving process of the radio communication apparatus in accordance with the exemplary embodiment 2.
Figure 21:
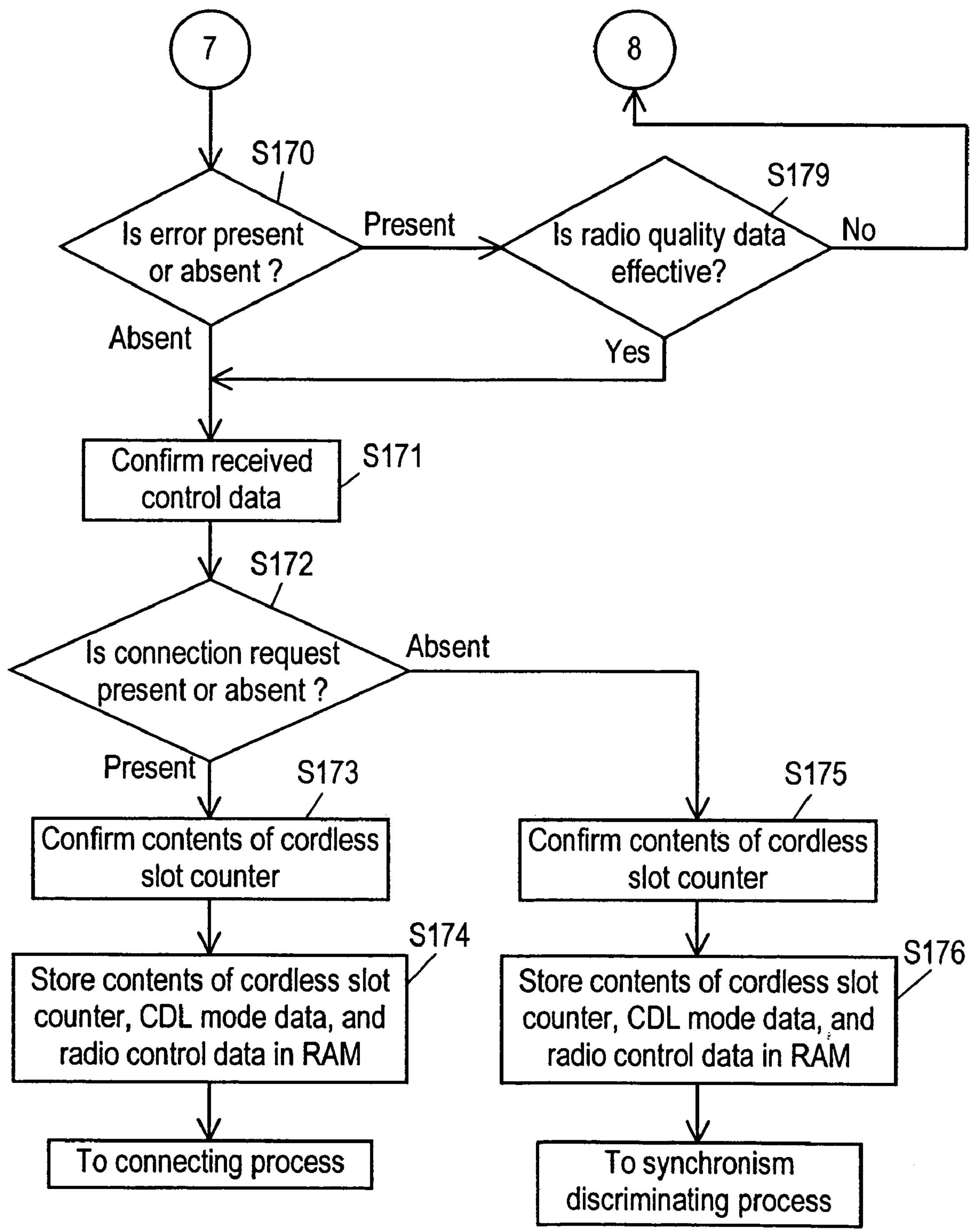
FIG. 21 is another part of a flow chart of the CDL synchronization receiving process of the radio communication apparatus in accordance with the exemplary embodiment 2.

In FIG. 20 and FIG. 21, CDL synchronization receiver 146 performs a CDL synchronization receiving process.

Channel calculating unit 161 sets a hopping channel number to be equal to that in the BT mode, or calculates a hopping channel number from a hopping table prepared for the CDL (S161). Channel setting unit 152 sets a CDL reception channel number calculated in step S161 to frequency synthesizer 8, thereby setting radio units 1, 2, 8 (S162). Next, slot setting unit 159 sets a slot number at N (number N set in FIG. 17) (S163). Receiving unit 162 receives slot number N (S164), and notification presence/ absence determining unit 153 determines the presence or absence of notification from synchronism discriminator 5 (S165 and S166). When the notification is determined to be present, it is determined whether or not the notification is in the CDL mode (S167). When the notification is in the CDL mode, mode setting unit 156 sets the CDL mode to burst received-data generator 4 (S168). Error determining unit 157 then determines the presence or absence of an error based on received radio quality data 202 (S169 and S170). When the absence of the error is determined, connection request determining unit 163 determines the presence or absence of a connection request based on received radio control data 201 (S171 and S172). When the connection request is present, counter content determining unit 166 confirms contents of cordless slot counter 30 (S173), and storage unit 165 inputs the contents of cordless slot counter 30, mode data indicating the CDL mode, and radio control data 201 into RAM 34 (S174). The process then proceeds to a connecting process in FIG. 22. When the connection request is absent, counter content determining unit 166 confirms the contents of cordless slot counter 30 (S175), and storage unit 165 inputs the contents of cordless slot counter 30, mode data indicating the CDL mode, and radio control data 201 into RAM 34 (S176). The process then proceeds to the synchronism discriminating process in FIG. 17. When the notification is determined to be absent in step S166 or the notification is not in the CDL mode in step S167, error determining unit 157 determines there is a reception error (S177). Time determining unit 154 then determines whether or not a predetermined time elapses since the reception of slot number N (S178). The process proceeds to the synchronism discriminating process in FIG. 17 when the predetermined time does not elapse, and returns to the common initial receiving process when the predetermined time elapses. When the presence of the error is determined in step S170, the process proceeds to step S179. The process proceeds to step S171 when radio quality data 202 is effective, and to step S177 when radio quality data 202 is ineffective.

Figure 22:
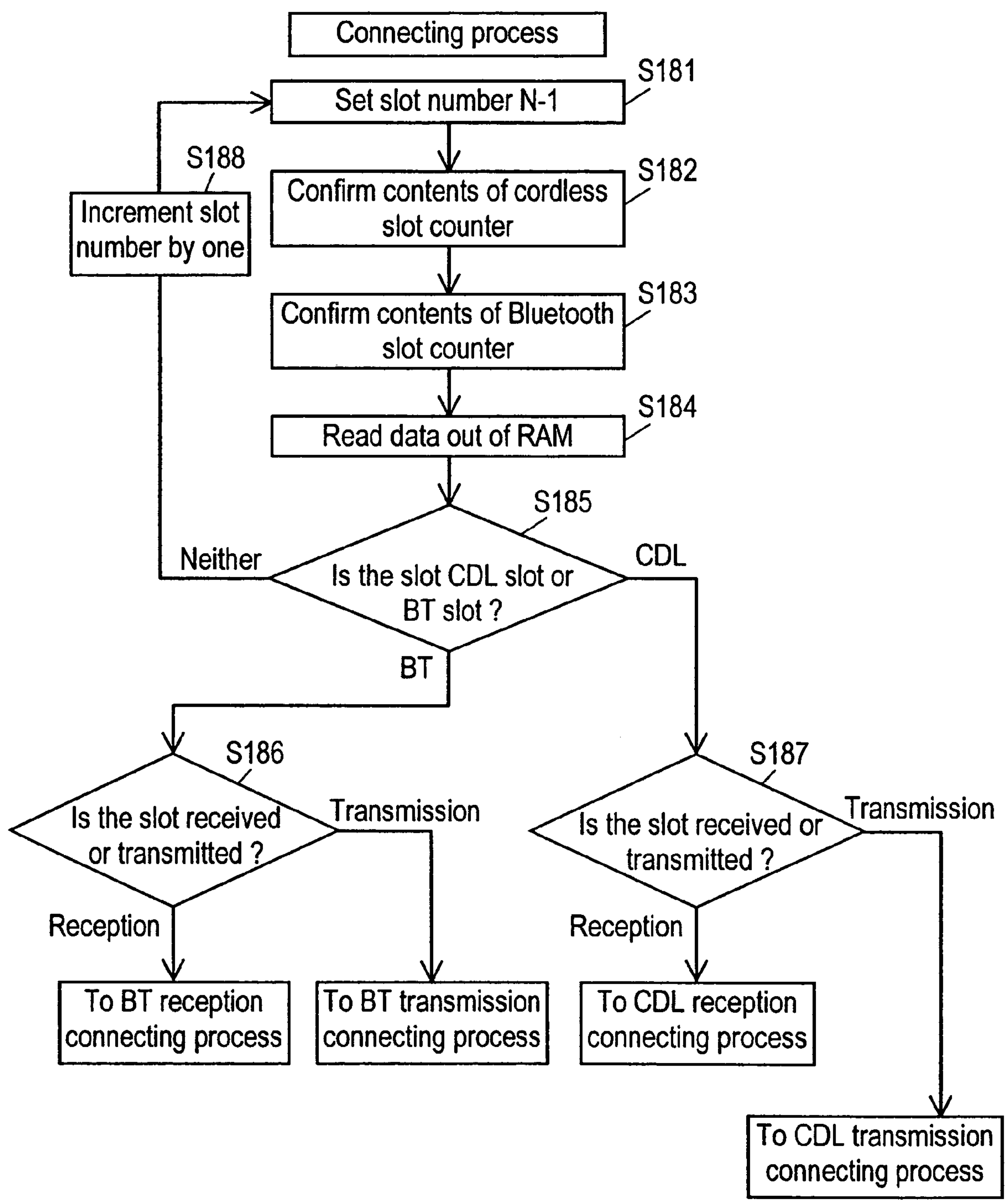
FIG. 22 is a flow chart of a connecting process of the radio communication apparatus in accordance with the exemplary embodiment 2.

In FIG. 22, connecting unit 147 performs a connecting process.

A common part of the connecting process is firstly described. Slot setting unit 159 sets slot number N to be N-1 (S181). Counter content determining unit 166 confirms contents of cordless slot counter 30 and Bluetooth slot counter 31 (S182 and S183). Reading unit 160 reads CDL and BT data formats out of RAM-34 (S184). Slot determining unit 167 determines whether the received slot is a BT slot or a CDL slot based on the determination results of slot counters 30, 31 and contents read from RAM 34 (S185). When the received slot is determined to be a BT slot, the process proceeds to a BT reception connecting process in reception or a BT transmission connecting process in transmission (S186). When the received slot is determined to be a CDL slot, the process proceeds to a CDL reception connecting process in reception or a CDL transmission connecting process in transmission (S187). When the received slot is determined to be neither BT nor CDL slot in step S185, the slot number is incremented by one. The process then returns to step S181.

Figure 23:
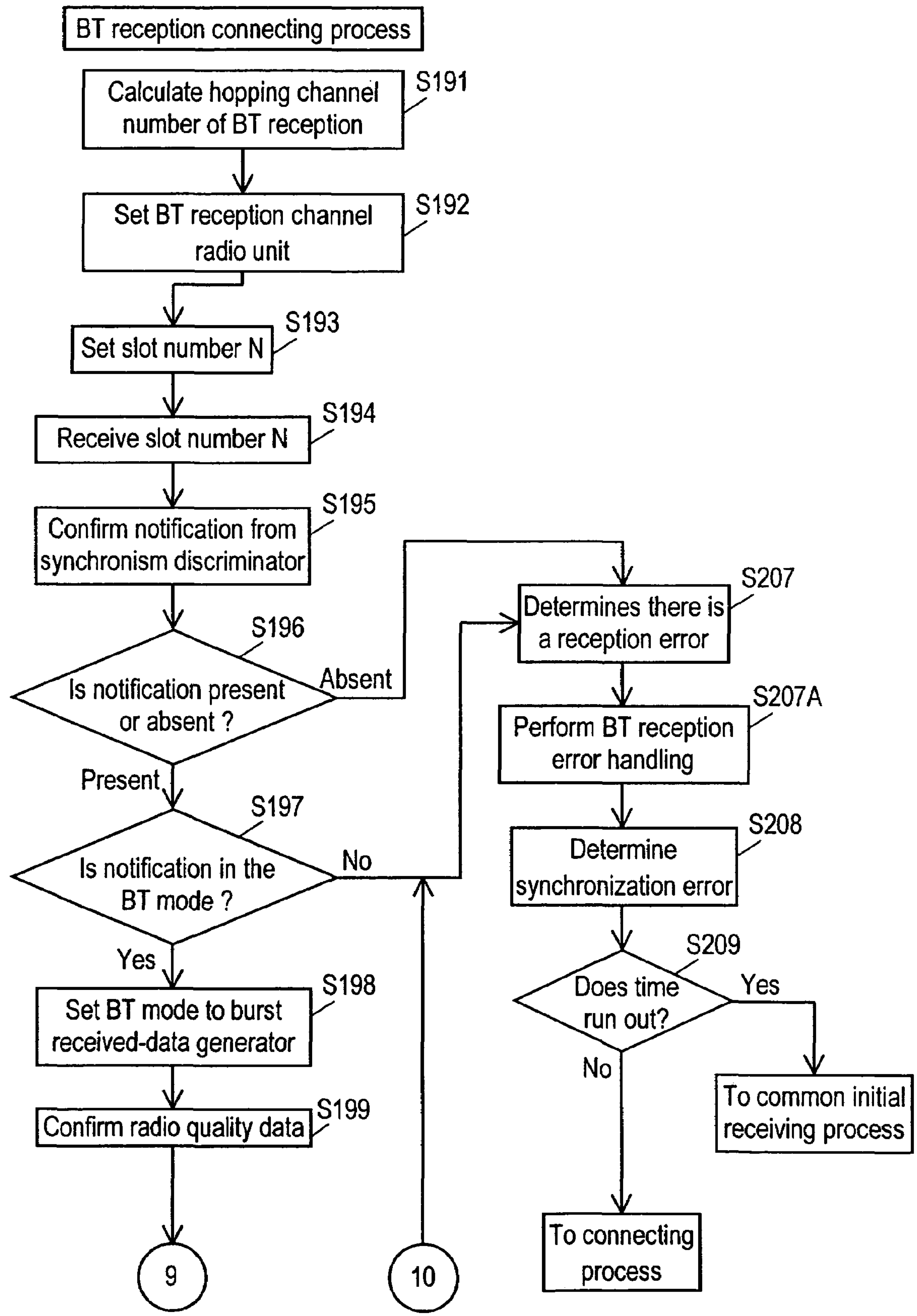
FIG. 23 is a flow chart of a BT reception connecting process of the radio communication apparatus in accordance with the exemplary embodiment 2.
Figure 24:
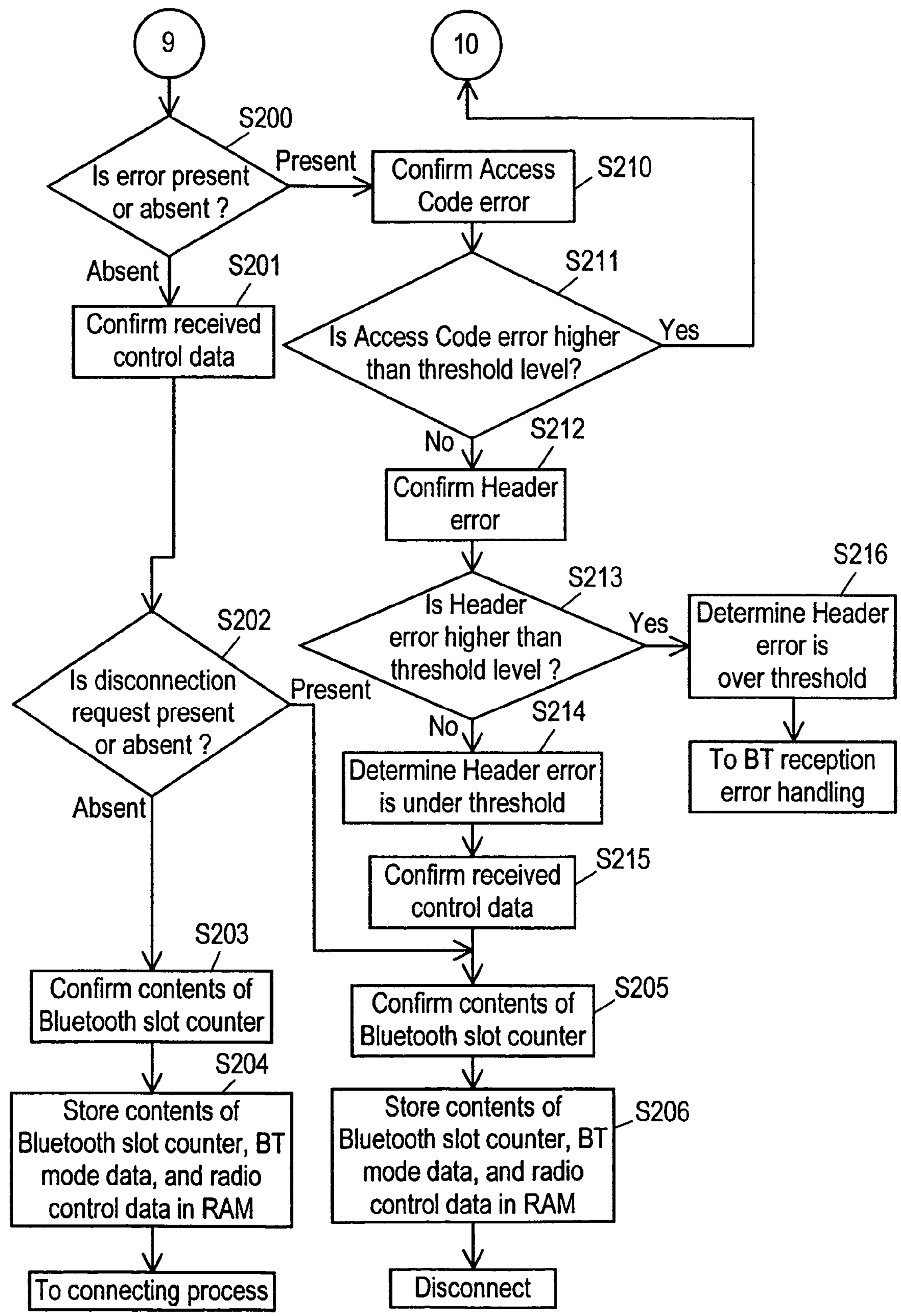
FIG. 24 is a flow chart of the BT reception connecting process of FIG. 23.

In FIG. 23 and FIG. 24, BT reception connecting unit 148 performs a BT reception connecting process.

Firstly, channel calculating unit 161 calculates a random hopping channel number to be generated from a BT device address and a BT clock (S191). Channel setting unit 152 sets a BT reception channel number calculated in step S191 to frequency synthesizer 8, thereby setting radio units 1, 2, 8 (S192). Next, slot setting unit 159 sets the slot number at N (number N set in FIG. 22) (S193). Receiving unit 162 receives slot number N (S194), and notification presence/absence determining unit 153 determines the presence or absence of notification from synchronism discriminator 5 (S195 and S196). When the notification is determined to be present, it is determined whether or not the notification is in the BT mode (S197). When the notification is in the BT mode, mode setting unit 156 sets the BT mode to burst received-data generator 4 (S198). Error determining unit 157 then determines, the presence or absence of an error based on received radio quality data 202 (S199 and; S200). When the absence of the error is determined, disconnection request determining unit. 168 determines the presence or absence of a disconnection request based on received radio control data 201 (S201 and S202). When the disconnection request is absent, counter content determining unit 166 confirms contents of Bluetooth slot counter 31 (S203), and storage unit 165 inputs the contents of Bluetooth slot counter 31, mode data indicating the BT mode, and radio control data 201 into RAM 34 (S204). The process then proceeds to the connecting process in FIG. 12. When the disconnection request is present, counter content determining unit 166 confirms contents of Bluetooth slot counter 31 (S205), and storage unit 165 inputs the contents of Bluetooth slot counter 31, mode data indicating the BT mode, and radio control data 201 into RAM 34 (S206). The process then proceeds to the disconnecting process (not shown). When the notification is determined to be absent in step S196 or the notification is not in the BT mode in step S197, error determining unit 157 determines there is a reception error (S207). The process proceeds to a Bluetooth reception error handling (S207A), and a synchronization error is determined to occur (S208). Time determining unit 154 then determines whether or not a predetermined time elapses since the reception of slot number N (S209). The process proceeds to the connecting process in FIG. 22 when the predetermined time does not elapse, and returns to the common initial receiving process in FIG. 14 when the predetermined time elapses. When the presence of the error is determined in step S200, an Access Code error is confirmed (S210). It is determined whether or not the Access Code error is higher than a threshold level (S211). When the Access Code error is the threshold level or lower, a Header error is confirmed (S212). It is then determined whether or not the Header error is a threshold level or lower (S213). When the Header error is the threshold level or lower, the under threshold is determined (S214). Next, the received control data is confirmed (S215), and the process proceeds to step S205. When the Access Code error is determined to exceed the threshold level in step S211, the process proceeds to step S207. When the Header error is determined to exceed the threshold level in step S213, the Header error is determined to be over threshold (S216) and the process proceeds to the BT reception error handling.

Figure 25:
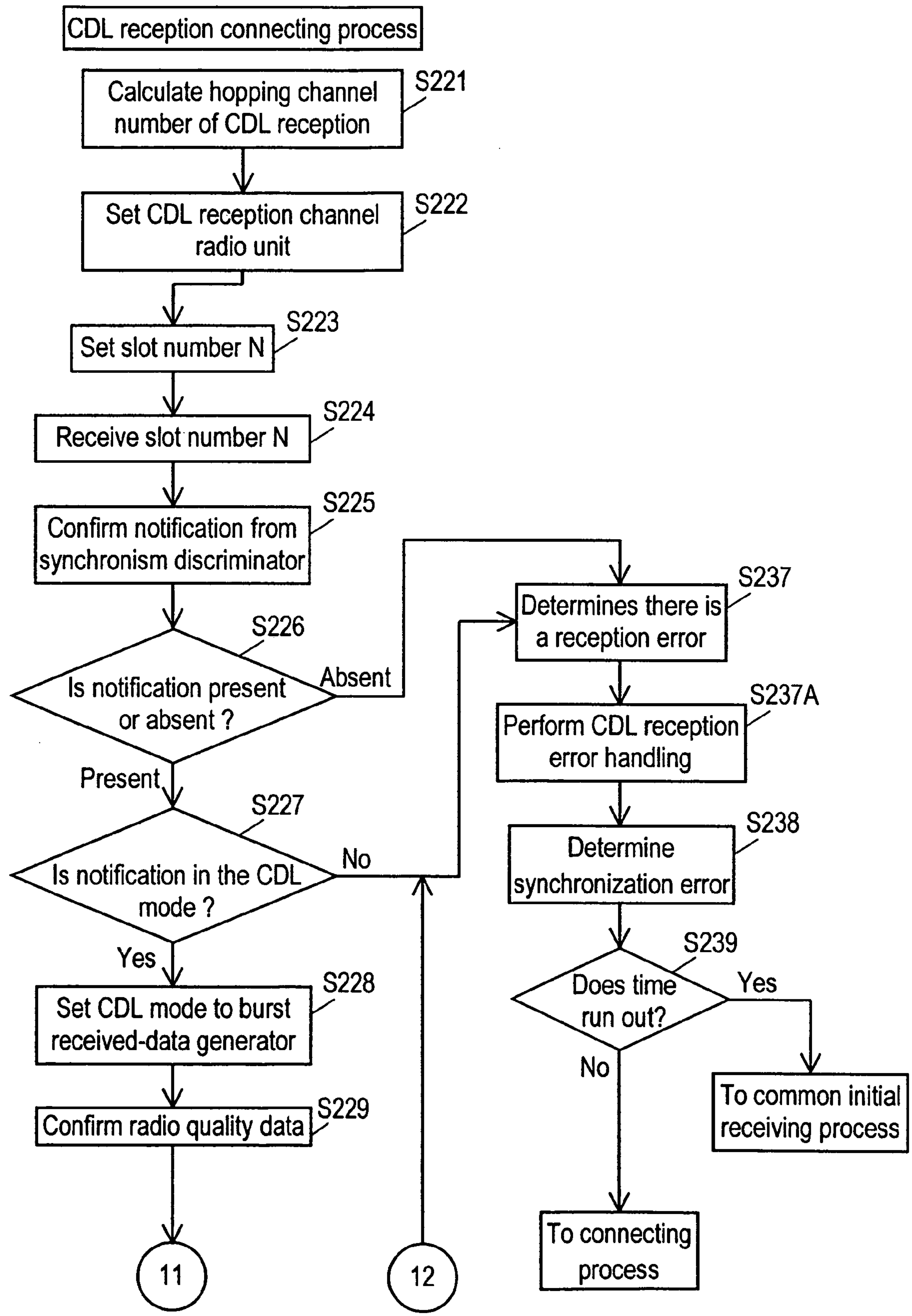
FIG. 25 is a flow chart of a CDL reception connecting process of the radio communication apparatus in accordance with the exemplary embodiment 2.
Figure 26:
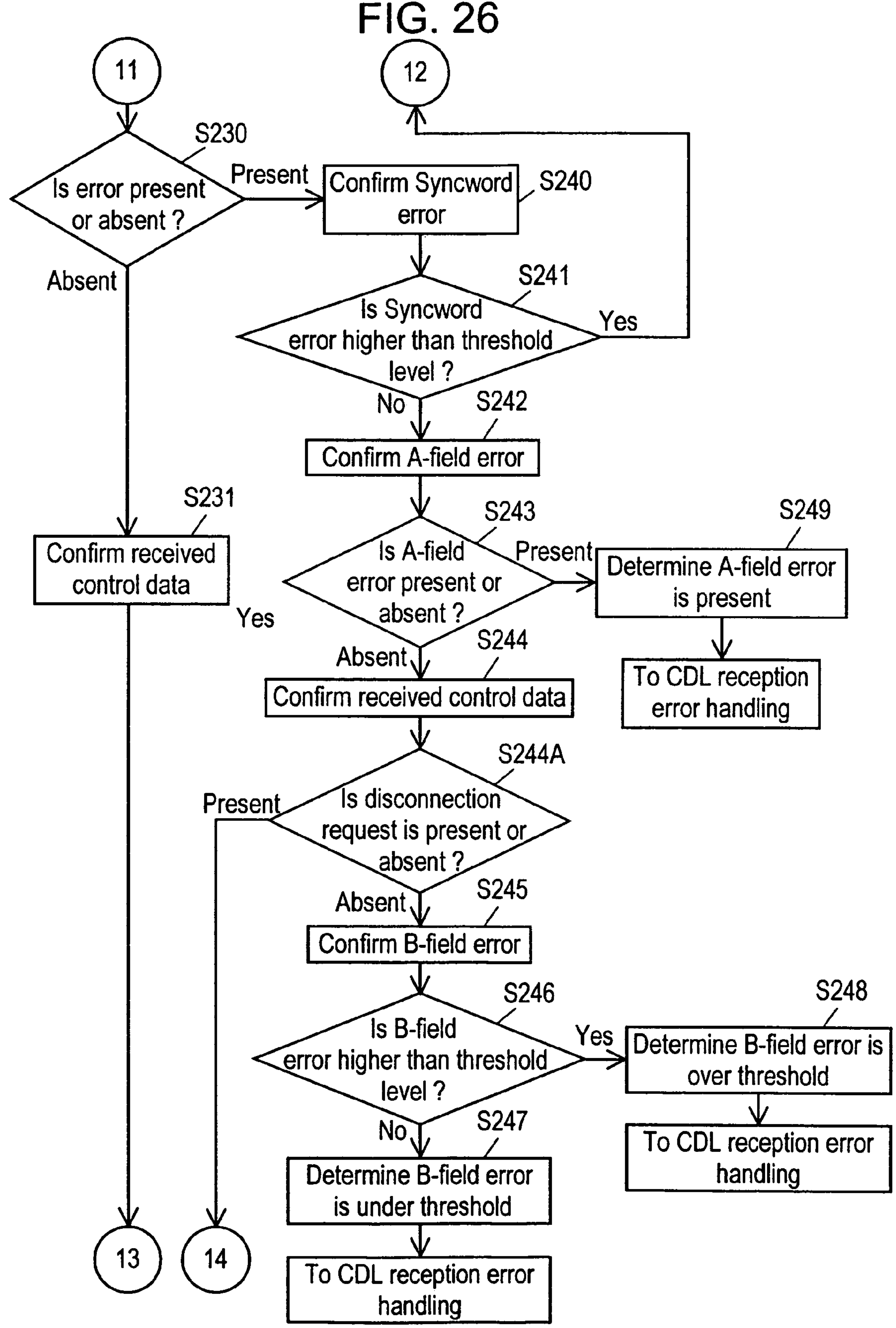
FIG. 26 is a continuous flow chart of the CDL reception connecting process of FIG. 25.
Figure 27:
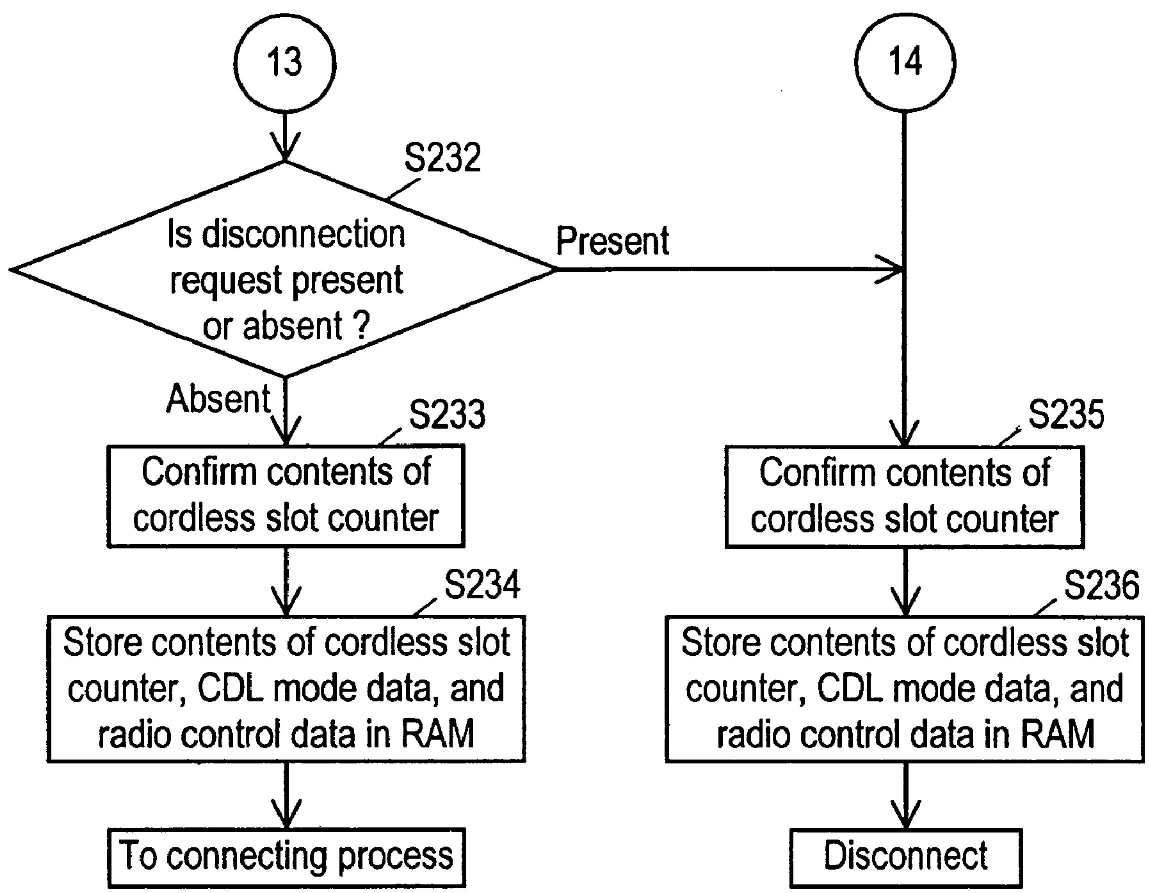
FIG. 27 is a continuous flow chart of the CDL reception connecting process of FIG. 26.

In FIG. 25, FIG. 26, and FIG. 27, CDL reception connecting unit 149 performs a CDL reception connecting process.

Firstly, channel calculating unit 161 sets a hopping channel number to be equal to that in the BT mode, or calculates a hopping channel number from the hopping table prepared for the CDL (S221). Channel setting unit 152 sets a CDL reception channel number calculated in step S221 to frequency synthesizer 8, thereby setting radio units 1, 2, 8 (S222). Next, slot setting unit 159 sets the slot number at N (number N set in FIG. 22) (S223). Receiving unit 162 receives slot number N (S224), and notification presence/absence determining unit 153 determines the presence or absence of notification from synchronism discriminator 5 (S225 and S226). When the notification is determined to be present, it is determined whether or not the notification is in the CDL mode (S227). When the notification is in the CDL mode, mode setting unit 156 sets the CDL mode to burst received-data generator 4 (S228). Error determining unit 157 then determines the presence or absence of an error based on received radio quality data 202 (S229 and S230). When the absence of the error is determined, disconnection request determining unit 168 determines the presence or absence of a disconnection request based on received radio control data 201 (S231 and S232). When the disconnection request is absent, counter content determining unit 166 confirms contents of cordless slot counter 30 (S233), and storage unit 165 inputs the contents of cordless slot counter 30, mode data indicating the CDL mode, and radio control data 201 into RAM 34 (S234). The process then proceeds to the connecting process in FIG. 12. When the disconnection request is present, counter content determining unit 166 confirms contents of cordless slot counter 30 (S235), and storage unit 165 inputs the contents of cordless slot counter 30, mode data indicating the CDL mode, and radio control data 201 into RAM 34 (S236). The process then proceeds to the disconnecting process (not shown). When the notification is determined to be absent in step S226 or the notification is not in the CDL mode in step S227, error determining unit 157 determines there is a reception error (S237). The process then proceeds to a CDL reception error handling (S237A), and a synchronization error is determined to occur (S238). Time determining unit 154 then determines whether or not a predetermined time elapses since the reception of slot number N (S239). The process proceeds to the connecting process in FIG. 22 when the predetermined time does not elapse, and returns to the common initial receiving process in FIG. 14 when the predetermined time elapses. When the presence of the error is determined in step S230, error determining unit 157 confirms a Syncword error (S240). Error determining unit 157 determines whether or not the Syncword error is higher than a threshold level (S241). When the Syncword error is the threshold level or lower, error determining unit 157 confirms an A-field error (S242). Error determining unit 157 determines whether the A-field error is present or absent (S243). When the A-field error is determined to be absent, the received control data is confirmed (S244), and the presence or absence of a disconnection request is determined (S244A). When the disconnection request is absent, a B-field error is confirmed (S245). It is determined whether or not the B-field error is a threshold level or lower (S246). When the B-field error is the threshold level or lower, the under threshold is determined (S247), and the process proceeds to the CDL reception error handling. When the B-field error is determined to exceed the threshold level, the over threshold is determined (S248), and the process proceeds to the CDL reception error handling. When the A-field error is determined to be present in step S243, the process proceeds to the CDL reception error handling (S249). When the Syncword error is determined to exceed the threshold level in step S241, the process proceeds to step S237. When the disconnection request is determined to be present in step S244A, the process proceeds to step S235.

Figure 28:
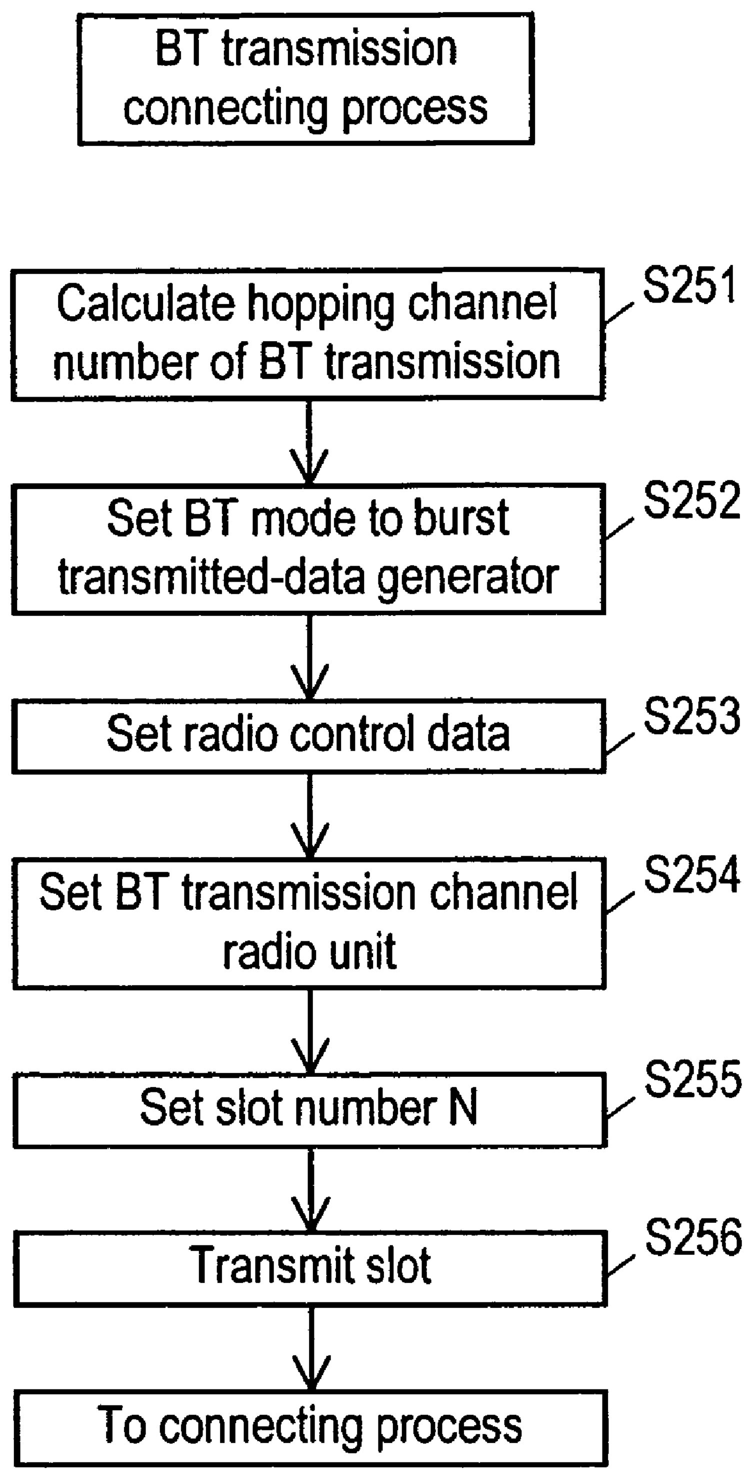
FIG. 28 is a flow chart of a BT transmission connecting process of the radio communication apparatus in accordance with the exemplary embodiment 2.

In FIG. 28, Bluetooth (BT) transmission connecting unit 150 performs a BT transmission connecting process.

Firstly, channel calculating unit 161 calculates a random hopping channel number to be generated from a BT device address and a BT clock (S251). Mode setting unit 156 sets the mode of burst transmitted-data generator 23 to be the BT mode (S252), and inputs required radio control data 206 into burst transmitted-data generator 23 (S253). Channel setting unit 152 sets a BT transmission channel number calculated in step S251 to frequency synthesizer 8, thereby setting radio units 1, 8, 20 (S254). Next, slot setting unit 159 sets the slot number at N (number N set in FIG. 22) (S255), and transmitting unit 169 transmits data at slot number N (S256). The process then proceeds to the connecting process in FIG. 22.

Figure 29:
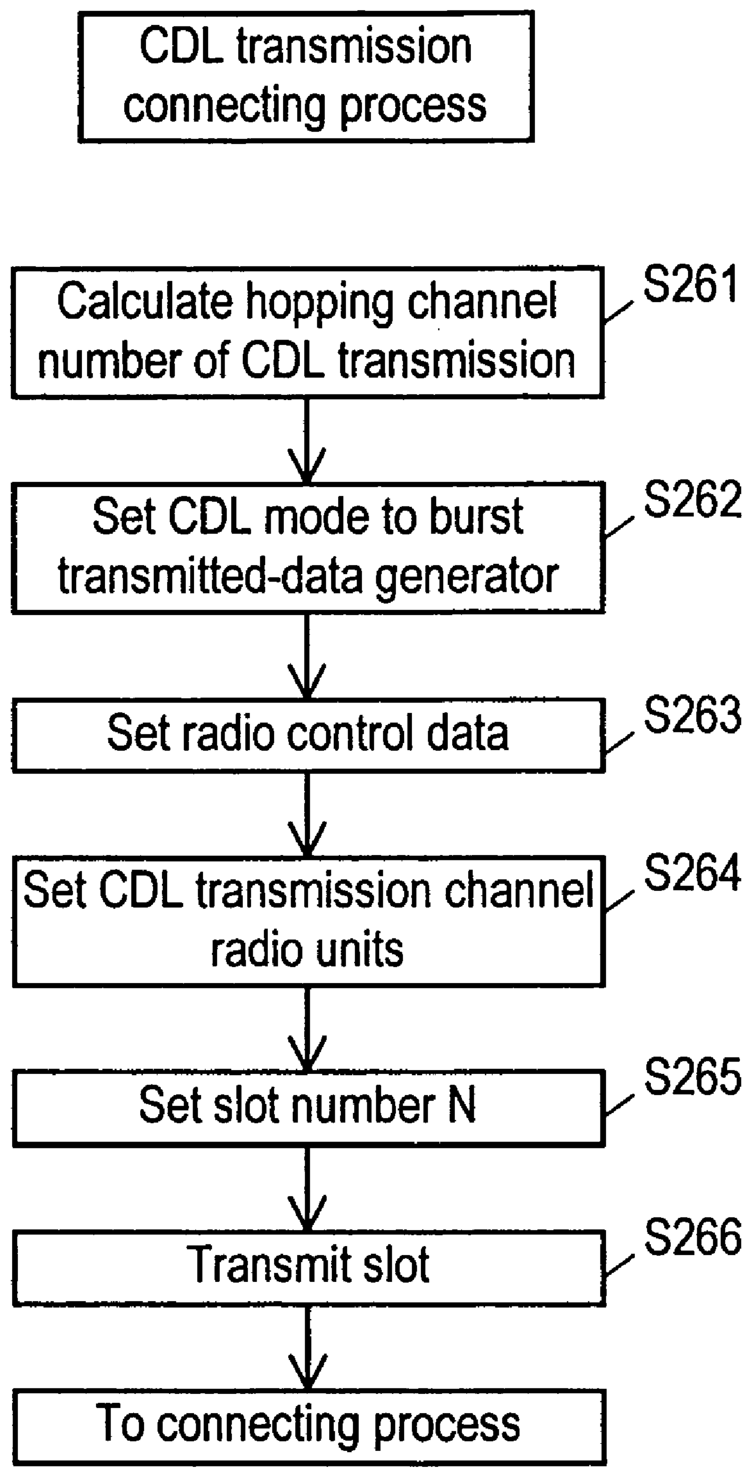
FIG. 29 is a flow chart of a CDL transmission connecting process of the radio communication apparatus in accordance with the exemplary embodiment 2.

In FIG. 29, cordless phone (CDL) transmission connecting unit 151 performs a CDL transmission connecting process.

Firstly, channel calculating unit 161 sets a hopping channel number to be equal to that in the BT mode, or calculates a hopping channel number from the hopping table prepared for the CDL (S261). Mode setting unit 156 sets the mode of burst transmitted-data generator 23 to be the CDL mode (S262), and inputs required radio control data 206 into burst transmitted-data generator 23 (S263). Channel setting unit 152 sets a CDL transmission channel number calculated in step S261 to frequency synthesizer 8, thereby setting radio units 1, 8, 20 (S264). Next, slot setting unit 159 sets the slot number at N (number N set in FIG. 22) (S265), and transmitting unit 169 transmits data at slot number N (S266). The process then proceeds to the connecting process in FIG. 22.

As discussed above, a radio communication apparatus of the present embodiment comprises a radio unit for transmitting or receiving radio signals corresponding to a plurality of radio communication standards and a signal discrimination processor for discriminating the radio signals corresponding to the plurality of radio communication standards and performing a process corresponding to a discrimination result. Even when a plurality of radio signals corresponding to the radio communication standards exist together, this structure allows discrimination of the radio signals corresponding, to respective radio communication standards and allows process corresponding to the discrimination result. Therefore, a complex process can be eliminated in which a radio signal corresponding to a transmitted or received radio communication standard is assumed and a mode is set, and the radio signal corresponding to the radio communication standard can be efficiently processed. The signal discrimination processor may be formed of an IC with one chip.

Controllers 6, 9 select an initial receiving process of the Bluetooth (BT) or the cordless phone (CDL) in response to a discrimination result of synchronism discriminator 5. When the BT signal and the CDL signal exist together, one of BT and CDL initial receiving processes is automatically performed. In a connecting process after a synchronism discriminating process, a BT reception or transmission connecting process or a CDL reception or transmission connecting process can be determined. Therefore, the BT transmission or reception or the CDL transmission or reception can be certainly performed.

BT initial receiver 142 and CDL initial receiver 143, when an error exists and the radio quality data is ineffective, proceed to the initial receiving process, thereby certainly preventing an improper operation in the initial receiving process.

BT synchronization receiver 145 and CDL synchronization receiver 146, when an error exists and the radio quality data is ineffective, proceed to the initial receiving process after the elapse of a predetermined time or to the synchronism discriminating process before the elapse of the predetermined time. Thus, an improper operation is certainly prevented in the synchronization receiving process.

BT reception connecting unit 148 proceeds to a BT reception error handling, when notification of the discrimination result from synchronism discriminator 5 for discriminating a plurality of radio communication standard signals is absent, or when the notification of the discrimination result is present and the discriminated standard is not the BT. BT reception connecting unit 148 then proceeds to the initial receiving process after the elapse of a predetermined time, or to the connecting process before the elapse of the predetermined time. Thus, an improper operation is certainly prevented in the reception connecting process.

CDL reception connecting unit 149 proceeds to a CDL reception error handling, when notification of the discrimination result from synchronism discriminator 5 for discriminating a plurality of radio communication standards is absent, or when the notification of the discrimination result is present and the discriminated standard is not the CDL. CDL reception connecting unit 149 then proceeds to the initial receiving process after the elapse of a predetermined time, or to the connecting process before the elapse of the predetermined time. Thus, an improper operation is certainly prevented in the reception connecting process.

Radio units 1, 2, 8, 20 transmit data at a transmission level optimal to each communication standard. In other words, Radio units 1, 2, 8, 20 transmit the data at a transmission power up to 20 dBm in the BT mode or up to 30 dBm in the CDL mode. Thus, the data is certainly communicated.

Controllers 6, 9 receive or transmit a BT signal and a CDL signal while time-sharing one frame comprising a plurality of slots without overlapping. The BT signal and the CDL signal can be thus communicated simultaneously in parallel.

When, during radio communication with a first slot group, a synchronizing signal of radio communication of a different kind from the former radio communication is received with a slot in a second slot group, the communication connection is performed with the second slot group in the same kind of radio communication as the present synchronizing signal. Therefore, even when signals are in a plurality of different radio communication modes, one radio transceiver can communicate the signals simultaneously with different slot groups.

The processes are performed stepwise, for example, an initial receiving process of first or second radio communication is performed in response to the discrimination result from synchronism discriminator 5, and then the synchronism discriminating process or the connecting process is performed in response to the effectiveness or ineffectiveness of the radio quality. Therefore, even when the first radio communication and the second radio communication exist together, switching to either radio communication can be automatically performed and thus the speaking can be started speedily and certainly.

Two communication standards, namely Bluetooth and cordless phone, have been described in the embodiments; however, a radio communication apparatus may comprise a radio unit or a function realizing unit corresponding to the other communication standard.

The invention claimed is:

1. A radio communication apparatus communicating with another radio communication apparatus, the radio communication apparatus comprising:

a radio unit configured to receive a sound signal from the another radio communication apparatus;

a format discriminator configured to discriminate whether the received sound signal is utilized in a first mode or in a second mode;

a first processor configured to attenuate the discriminated first sound signal when a first difference between a level of a present first sound signal and a level of a previous first sound signal exceeds a first predetermined value in the first mode;

a second processor configured to attenuate the discriminated second sound signal when a second difference between a level of a present second sound signal and a level of a previous second sound signal exceeds a second predetermined value in the second mode; and a controller configured to output, to a speaker of the radio communication apparatus, the attenuated first sound signal and the attenuated second sound signal.

2. A radio communication apparatus according to claim 1, said second processor configured to attenuate the discriminated second sound signal when a difference between an average level of said second sound signal and a level of a present second sound signal exceeds a third predetermined value in the second mode.

3. A radio communication apparatus according to claim 1, said second processor configured to filter the discriminated second sound signal when a second difference between a level of a present second sound signal and a level of a previous second sound signal exceeds a second predetermined value in the second mode.

4. A radio communication apparatus according to claim 1, said first mode is according to Bluetooth standard and said second mode is according to a standard other than Bluetooth standard.

* * * * *